US011950031B2

(12) United States Patent
Bilal et al.

(10) Patent No.: US 11,950,031 B2
(45) Date of Patent: Apr. 2, 2024

(54) TRANSMISSION IMPAIRMENT COMPENSATION IN POINT-TO-MULTIPOINT COMMUNICATION SYSTEMS

(71) Applicant: Infinera Corporation, San Jose, CA (US)

(72) Inventors: Syed Muhammad Bilal, Nuremburg (DE); Christopher Fludger, Nuremburg (DE); Scott Pringle, Ottawa (CA); Mehdi Karimi, Ottawa (CA); William Isaac, Ottawa (CA)

(73) Assignee: Infinera Corporation, San Jose, CA (US)

( * ) Notice: Subject to any disclaimer, the term of this patent is extended or adjusted under 35 U.S.C. 154(b) by 204 days.

(21) Appl. No.: 17/479,925

(22) Filed: Sep. 20, 2021

(65) Prior Publication Data
US 2022/0095023 A1 Mar. 24, 2022

Related U.S. Application Data

(60) Provisional application No. 63/081,537, filed on Sep. 22, 2020, provisional application No. 63/081,648, filed on Sep. 22, 2020.

(51) Int. Cl.
*H04Q 11/00* (2006.01)
*H04W 56/00* (2009.01)

(52) U.S. Cl.
CPC .... *H04Q 11/0005* (2013.01); *H04W 56/0005* (2013.01); *H04W 56/0015* (2013.01); *H04Q 2011/0045* (2013.01); *H04Q 2011/005* (2013.01)

(58) Field of Classification Search
CPC ....... H04Q 11/0005; H04Q 2011/0045; H04Q 2011/005; H04W 56/0005; H04W 56/0015; H04B 10/2507; H04J 14/0282; H04J 14/0298
USPC ......................................................... 375/354
See application file for complete search history.

(56) References Cited

U.S. PATENT DOCUMENTS

| | | | | |
|---|---|---|---|---|
| 2005/0078682 A1* | 4/2005 | Kim | ........................ | H04L 65/80 370/395.5 |
| 2006/0269028 A1* | 11/2006 | Bley | ...................... | G01D 21/00 375/354 |
| 2010/0177708 A1* | 7/2010 | Pandey | ................. | H04W 56/00 370/329 |
| 2013/0315226 A1* | 11/2013 | Bombelli | .......... | H04W 56/0015 370/350 |

\* cited by examiner

*Primary Examiner* — Don N Vo
(74) *Attorney, Agent, or Firm* — David L. Soltz

(57) ABSTRACT

Systems and methods for performing impairment compensation in point-to-multi-point communication systems are described. In a data snapshot mode, a hub node can send instructions to each communication node connected to the hub node to send a data snapshot of data being received and processed by the communication nodes at a particular time. In a trench line mode, a hub node sends instructions to each communication node to send trench line data back to the hub node. The hub node uses the data snapshot or trench line data to determine how to tune filter coefficients in the hub node to perform impairment compensation and improve performance of the communication system.

20 Claims, 14 Drawing Sheets

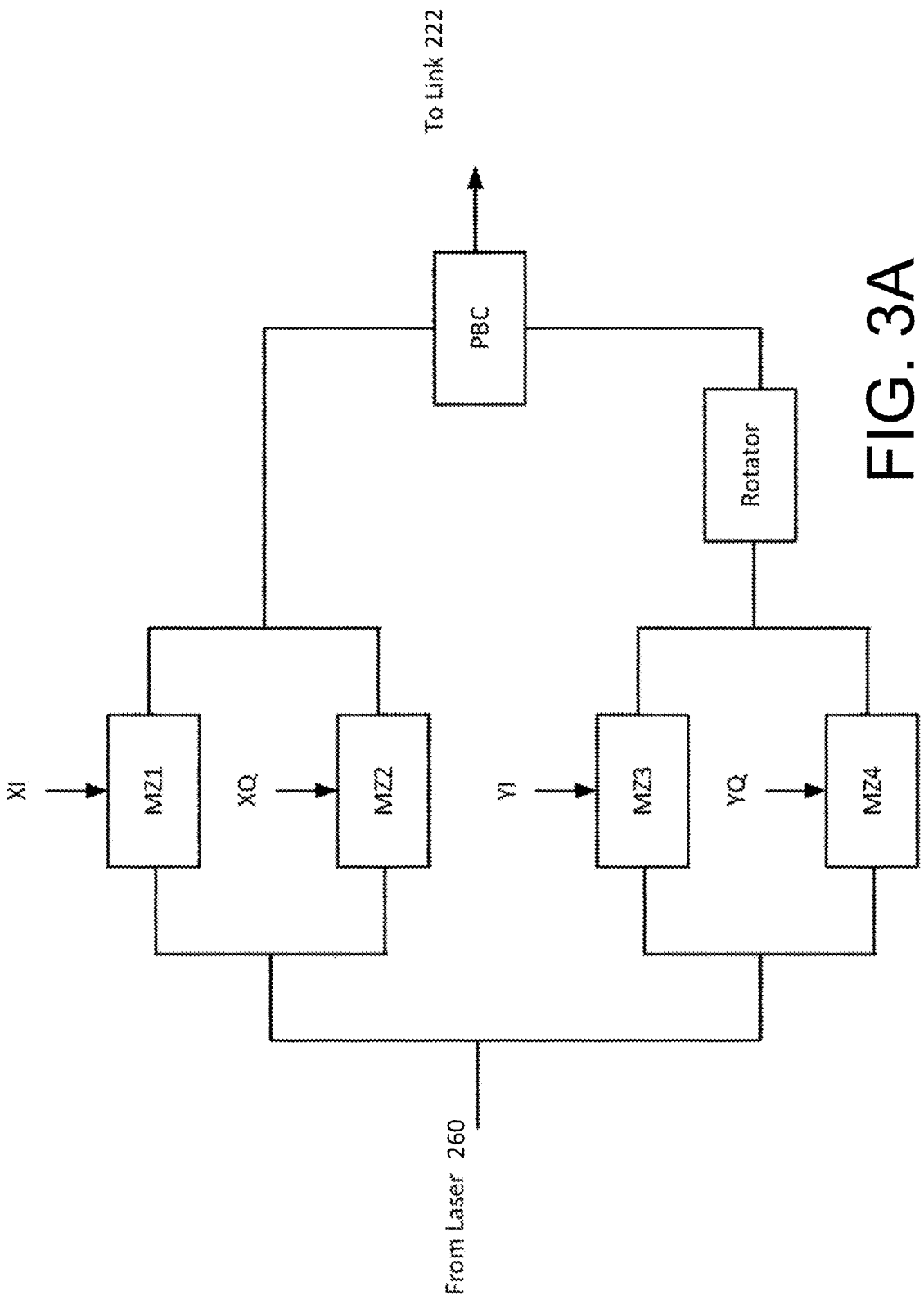

TRANSMISSION IMPAIRMENT COMPENSATION IN POINT-TO-MULTIPOINT COMMUNICATION SYSTEMS

CROSS-REFERENCE TO RELATED APPLICATIONS

This application claims the benefit of U.S. Provisional Application No. 63/081,537, filed Sep. 22, 2020, and U.S. Provisional Application No. 63/081,648, filed Sep. 22, 2020, which are incorporated herein by reference in their entirety.

FIELD OF THE DISCLOSURE

This specification generally relates to wireless communication systems and compensation methods for improving data transmission in the communication systems.

BACKGROUND

Wireless communication systems often use multiple subcarriers to communicate data across communication networks. Some communication networks involve point-to-multipoint communications in which the destination receiving devices are deployed in different geographical locations around the world. Improved systems and methods are needed to compensate for impairments introduced by the transmitting device in the subcarrier signals transmitted across point-to-multipoint communication networks.

SUMMARY

In some implementations, a transmitting device, such as a hub node transmitter, can transmit data using subcarriers to multiple receiving devices with an instruction for each receiving device to take a data snapshot at a specific time. The receiving devices obtain the data snapshot at the requested time and send it back to the transmitter device through a feedback channel. The transmitter device can compare the data snapshots received from the receiving devices and execute a suitable compensation technique to address signal impairments generated as a result of the transmitting device transmitting multiple subcarriers.

In some implementations, a hub node may transmit data including headers in a frame alignment sequence (FAS) to one or more receiving devices. When the hub node transmits (to a receiving device) an instruction signal requesting the receiving device to provide feedback information to be used for impairment compensation, the receiving device obtains and stores a determined number of frame headers. Using the obtained frame headers, the receiving device can generate a synthetic Hermitian subcarrier pair and determine a trench line associated with the skew and quadrature error estimate. Data indicative of the trench line for a particular subcarrier is sent to the hub node, which can similarly collect trench line data from the other receiving devices in the communication network. Based on the data received from the one or more receiving devices, the transmitter impairments can be estimated by determining the mean-square-error (MSE) between the received and the known impaired header symbols.

This disclosure describes systems, methods, devices, and other implementations for implementing various signal impairment compensation techniques in point-to-multipoint systems with multiple subcarriers.

According to some aspects, a communications system includes a transceiver that includes a frame counter, at least one processor, a transmitter, and a receiver. The frame counter is configured to generate a trigger signal. The at least one processor is configured to generate a synchronization instruction message in response to generation of the trigger signal. The synchronization instruction message includes instructions to provide a data snapshot at a time. The transmitter is configured to transmit, using a plurality of subcarriers, the synchronization instruction message to a plurality of system nodes. Each of the plurality of subcarriers is associated with one of the plurality of system nodes. The receiver is configured to receive data snapshots from the plurality of system nodes. In response to receiving the data snapshots, the at least one processor is configured to compensate data transmissions to the plurality of system nodes based on the data snapshots.

Implementations of these aspects can include one or more of the following features.

In some implementations, the frame counter is configured to generate the trigger signal in response to a count of the frame counter equaling a number determined based on a periodicity of the subcarriers, a forward error correction frame length, and a Fast Fourier Transform window size.

In some implementations, the synchronization instruction message includes at least one of the time and date to provide the data snapshot, and a numerical count such that at an expiration of the numerical count, the data snapshot is to be provided to the receiver.

In some implementations, the transmitter is configured to transmit the synchronization instruction message simultaneously to each of the plurality of system nodes.

In some implementations, to compensate the data transmissions to the plurality of system nodes, the at least one processor is configured to reduce impairments in transmissions to the plurality of system nodes generated by the transmitter.

In some implementations, each of the plurality of system nodes is configured to receive the synchronization instruction message, determine the time at which a nodal data snapshot is to be obtained based on the synchronization instruction message, obtain the nodal data snapshot at the time, and transmit the nodal data snapshot through a feedback channel to the receiver.

In some implementations, the nodal data snapshot is part of the data snapshots provided by each of the plurality of system nodes to the receiver.

In some implementations, for each of the plurality of system nodes, the data snapshot includes a copy of a portion of node-specific data received from the transmitter and processed by the system node at the time.

In some implementations, to compensate data transmissions to the plurality of system nodes based on the data snapshots, the at least one processor is configured to determine filter coefficient values of a filter based on the data snapshots, configure the filter based on the filter coefficient values, and apply the filter to the data transmissions.

In some implementations, one or more of the plurality of system nodes are located in geographically different locations from other ones of the system nodes.

According to some aspects, an optical hub node is connected to a plurality of leaf nodes through an optical communication network. The optical hub node includes a transmitter and a receiver. The transmitter is configured to transmit, using a plurality of subcarriers, a synchronization instruction message to the plurality of leaf nodes. Each of the plurality of subcarriers is associated with one of the plurality of leaf nodes. The synchronization instruction message includes instructions to provide a data snapshot at a determined time. The receiver is configured to receive data snapshots from the plurality of leaf nodes. The optical hub node is configured to compensate data transmissions to the plurality of leaf nodes based on and upon receiving the data snapshots.

In some implementations, the optical hub node comprises a frame counter configured to count to a number determined based on a periodicity of the subcarriers, a forward error correction frame length, and a Fast Fourier Transform window size, and to generate a trigger signal in response to the frame counter counting to the number. The trigger signal is configured to trigger the transmission of the synchronization instruction message.

In some implementations, the synchronization instruction message includes at least one of a time and date to provide the data snapshot, and a numerical count such that at an expiration of the numerical count, the data snapshot is to be provided to the receiver.

In some implementations, the transmitter is configured to transmit the synchronization instruction message simultaneously to each of the plurality of leaf nodes.

In some implementations, to compensate the data transmissions to the plurality of leaf nodes, the transmitter is configured to reduce impairments in the data transmissions to the plurality of leaf nodes generated by the transmitter.

In some implementations, the data snapshots include a copy of a portion of node-specific data received from the transmitter and processed by each of the leaf nodes at the determined time.

In some implementations, to compensate data transmissions to the plurality of leaf nodes based on the data snapshots, the optical hub node is configured to determine filter coefficient values of a filter based on the data snapshots, configure the filter based on the filter coefficient values, and apply the filter to the data transmissions.

In some implementations, one or more of the plurality of leaf nodes are located in geographically different locations from other ones of the leaf nodes.

According to some aspects, an optical communication network node is connected to a communication network node hub. The optical communication network node includes a receiver, at least one processor, and a transmitter. The receiver is configured to receive a synchronization instruction message and nodal data destined for the optical communication network node. The synchronization instruction message includes instructions to send a data snapshot to the communication network node hub at a particular time. The at least one processor is configured to obtain the data snapshot at the particular time. The transmitter is configured to transmit the data snapshot to the optical communication network node.

In some implementations, the data snapshot includes a copy of a portion of the nodal data received and is processed by the optical communication network node at the particular time.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A depicts a block diagram of an example optical modulator circuit.

Like reference numbers and designations in the various drawings indicate like elements.

DETAILED DESCRIPTION

Technological advances have facilitated the growth of communication systems involving transmissions using multiple sub-carriers. Such systems can be advantageous as multiple sub-carrier systems have a high tolerance towards fiber non-linearities relative to single carrier systems. In a point-to-multipoint environment, multiple sub-carriers can be used to transmit data from a hub transmitter to multiple (e.g., hundreds) of receiver devices, also referred to as leaf nodes. The leaf nodes may be located in different areas of the world.

As with single carrier systems, signals transmitted from one device to another across a communication channel can incur various impairments. These impairments may be introduced, e.g., due to distortions and noise in the communication channel and/or noise introduced by electronic components in the transmitting device. One example of a transmitter device-based impairment is an impairment between in-phase and quadrature signals, also known as I/Q impairments. In multiple sub-carrier systems, I/Q impairments can impact the performance of the communication system adversely.

Impairment compensation techniques designed for single carrier systems are problematic to implement in multiple subcarrier systems because these techniques can induce additional distortion and, in some cases, may require more complex real valued multiple-input, multiple-output (MIMO) equalizers to mitigate performance degradation. In addition, some techniques to compensate multiple subcarrier impairments are limited to systems in which all the leaf nodes are in the same geographical location. Other compensation techniques may require data from subcarriers pairs and cannot compensate receivers that receive data over a single subcarrier.

Moreover, transmitter (Tx) impairments can cause severe performance degradation, especially for multi-subcarrier systems. Although Tx I/Q impairments can be calibrated out in the 1st stage of digital signal processing in a transmitting device, variations coming from digital to analog converters (DACs) and optics due to ageing and temperature can cause a drift in these impairments, especially I/Q skew, over the passage of time. This can lead to large penalties, especially for high baud-rate outer subcarriers. To minimize performance degradation, an active in-service compensation is required.

This disclosure and the accompanying figures describe systems, methods, and other implementations for performing impairment compensation in point-to-multipoint communication systems using multiple subcarriers. Advantageously, the impairment compensation methods can be applied in communication systems having leaf nodes in different geographical locations. Moreover, the impairment compensation can be performed for devices that are associated with a single subcarrier. As described in more detail below, impairment compensation can be performed under a snap-shot mode or a trench line mode.

Figure 1:
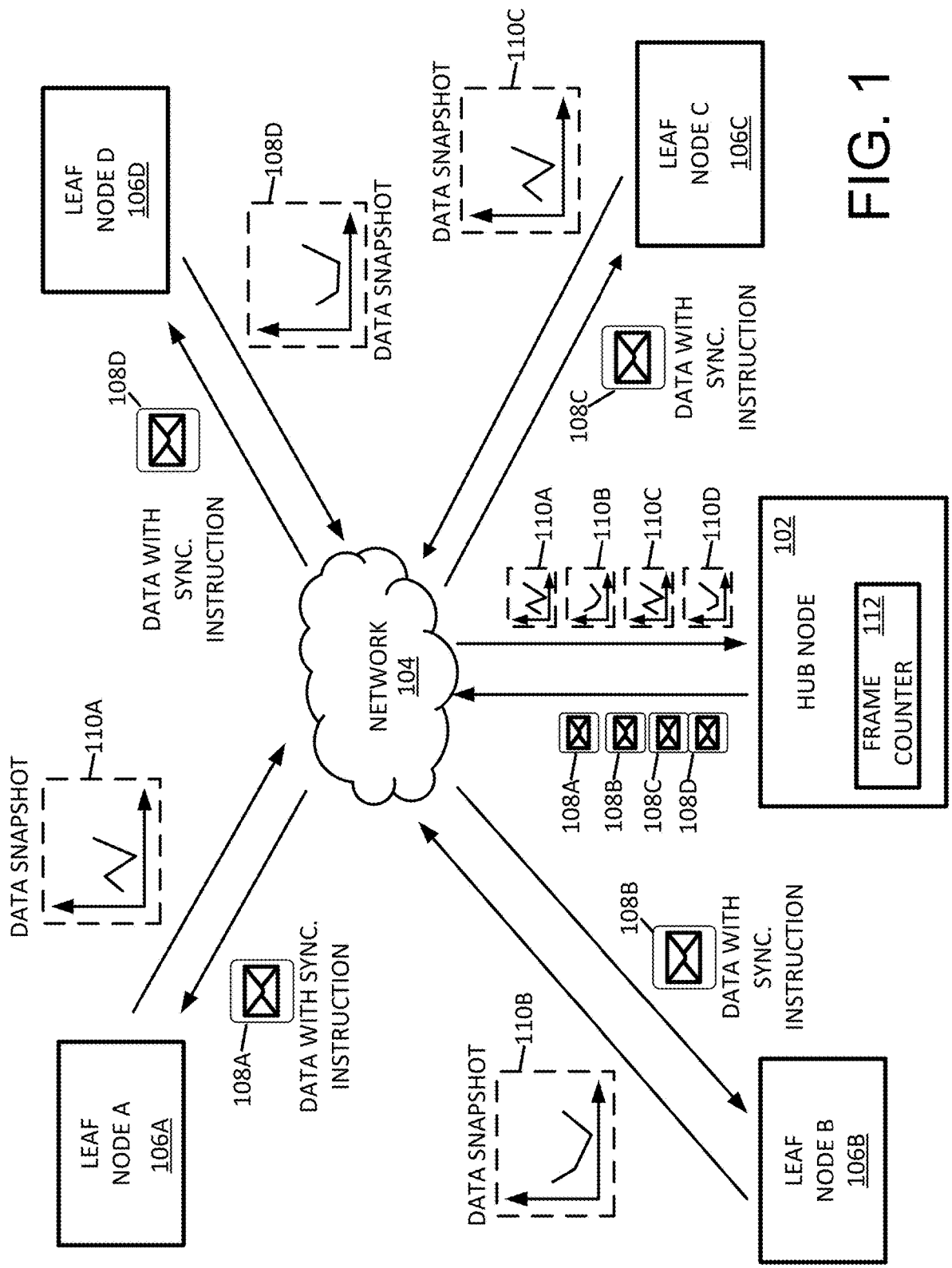
FIG. 1 depicts an example of a communication system that provides data snapshot feedback information for performing impairment compensation.

FIG. 1 depicts an example implementation of a system for performing impairment compensation using data snapshots. The example system includes a transmitter device, such as hub node 102, and leaf nodes 106A-106D that are communicatively coupled to one another by a communication network 104. Although only four leaf nodes are shown, the number of leaf nodes could range from two to the hundreds or more.

In some implementations, the system and/or the communication network 104 can be a part of one or more optical transport networks (OTNs). The hub node 102 can communicate with multiple leave nodes and is capable of handling each node individually. The leaf nodes 106A-106D can have a different data rate requirement and can be at different geographical locations.

Each of the network nodes 102 and 106A-106D can include one or more respective computer devices (e.g., server computers, client computers, portable electronic devices, databases, etc.). In some implementations, the network nodes 102 and 106A-106D can be configured such that each of the network nodes 102 and 106A-106D transmits data to and/or receives data from other nodes connected to the network 104. As an example, the hub node 102 can be configured to transmit data to and/or receive data from one or more of the leaf nodes 106A-106D.

The network nodes 102 and 106A-106D can include MIMO circuits (not shown) that connect the communication link (e.g., an optical link) between the nodes 102 and 106A-106D. The MIMO circuits include antennas for transmitting and receiving data, and one or more finite-impulse response (FIR) filters. Each FIR filter can have variable coefficients or tap weights that can be adapted to minimize subcarrier distortion associated with a modulator, DAC/analog-to-digital converter circuits (ADCs), and other analog circuitry within the transceiver in the network nodes 102 and 106A-106D. A least means-square error (MSE) technique can be employed to calculate the coefficient or tap weight values to minimize or compensate for errors in transmission or reception of data. In general, various suitable techniques that minimize the measured distortion or MSE can also be used, e.g., gradient descent methods and machine learning techniques. Various other suitable circuitry may be included in the MIMO circuits.

In some implementations, the hub node 102 can include a frame counter 112. The frame counter 112 is configured to count from zero to a determined number that can be determined based on a periodicity of the subcarriers and/or the forward error correction (FEC) frame length and Fast Fourier Transform (FFT) window size.

The frame counter 112 can operate in a plurality of modes including a single shot mode and a continuous mode. In the single shot mode, the frame counter 112 can count from zero to the determined number. In some implementations of the single shot mode, upon reaching the determined number, the frame counter 112 can generate a trigger signal. When not performing a count, the frame counter 112 can remain at a default zero count value. In the continuous mode, the frame counter 112 can count from zero to the determined number, and upon reaching the determined number, generate a trigger signal and restart the count from zero. This counting loop can be repeated continuously.

Although not shown in FIG. 1, each of the network nodes 102 and 106A-106D can include one or more transceivers for transmitting and/or receiving data via the communication links that are part of the communications network 104. For example, the hub node 102 can include a hub transceiver that is coupled to one or more communication links coupled to a transceiver in one or more leaf nodes 106A-106D. In general, at a transmitter portion of the transceiver (e.g., of the hub node 102), data is framed (with a known frame header) and mapped to symbols. The symbols are filtered and multiplexed together before being transmitted. In the receiver portion of the transceiver, multiple subcarriers may be received and demultiplexed. After performing filtering, polarization recovery (pol. MIMO), and carrier phase estimation, the resulting signal is essentially the transmitted signal but compromised by noise and any transmitter impairments.

In some implementations, the hub transceiver and/or the leaf transceiver can be pluggable devices that are configured to enhance the functionality of the network nodes 102 and 106A-106D. For example, at least some of the hub transceiver and/or the leaf transceiver can include a physical communications interface (e.g., a plug or socket) that is configured to reversibly insert into and/or receive corresponding physical communications interface of a network node 102 or 106A-106D, and exchange information with that network node to facilitate the performance of the operations described herein.

In some implementations, the communication network 104 can include optical links connecting the network nodes 102 and 106A-106D. Each of the optical links can be implemented using one or more lengths of optical fiber and/or equipment interconnecting the optical fiber (e.g., line system components). In some implementations, the optical links can collectively define at least a portion of the communications network 104.

In some implementations, a network node 102, 106A, 106B, 106C, or 106D can transmit data by generating optical signals that are modulated according to one or more optical subcarriers associated with the intended destination or destinations of the data. For example, the hub node 102 can receive or generate one or more data packets (e.g., from the hub node 102 itself and/or from another network node), ascertain the intended destination of each of the data packets, and identify one or more respective optical subcarriers that can be used to transmit data to each of those destinations. Based on this information, the hub node 102 can generate one or more optical signals (e.g., using one or more light emitters, such as laser emitters), modulate the optical signals according to the identified optical subcarriers (e.g., using one or more local oscillators, multiplexers, etc.), and transmit the modulated optical signals over one or more optical links to each of the intended destinations (e.g., one or more of the leaf nodes 106A-106D).

In some implementations, a network node 102, 106A, 106B, 106C, or 106D can generate an optical signal that is modulated according to multiple sets of optical subcarriers, where each subcarrier or set of subcarriers is associated with a different intended destination, e.g., a leaf node. Each of the network nodes can selectively recover the data stream that is intended for it (e.g., by detecting the optical signals using one or more photodetectors, and demodulating the optical signal according to the set of optical subcarriers that is associated with the network node, such as using one or more local oscillators).

Further, each of the leaf nodes 106A-106D can receive a respective instance of the optical signal, and selectively demodulate that instance of the optical signal according to the set of optical subcarriers to which it is assigned (e.g., to recover the data that is intended for it). Further, each of the leaf nodes 106A-106D can selectively ignore, block, or otherwise not demodulate the respective optical signal according to the sets of optical subcarriers to which it is not assigned (e.g., such that it refrains from recovering the data that is not intended for it).

To perform impairment compensation, the transmitting device or hub node 102 can add a synchronization instruction message or trench data instruction signal to the data intended for one or more leaf nodes 106A-106D. When the transmitting device is in the snap-shot mode and the frame counter 112 reaches the determined number, the frame counter 112 generates a trigger signal. A processor in the hub node 102 receives the trigger signal and generates the synchronization instruction message or signal to be transmitted to all the leaf nodes 106A-106D. The synchronization instruction message or signal includes an instruction or indication for a receiving leaf node to obtain a snap shot of the data received by the leaf node at a particular time.

For example, as shown in FIG. 1, data packets 108A-108D are transmitted from the hub node 102 to leaf nodes 106A-106D, respectively through the communication network 104. Because each leaf node is associated with a particular subcarrier, data designated for a particular leaf node is transmitted over the subcarrier associated with the particular leaf node. The data packets 108A, 108B, 108C, 108D can include data intended for each leaf node along with the synchronization instruction message or signal.

The synchronization instruction message or signal can convey timing information in various suitable ways. For example, in some implementations, the synchronization instruction message or signal can include a particular date and time at which the snapshot is to be taken. In some implementations, synchronization instruction message or signal can include a time counter that provides countdown data from a time at which data is transmitted from the hub node 102.

In response to receiving the data packets 108A-108D that include the synchronization instruction message or signal, the leaf node can then take a data snapshot when the time counter expires or at the specified date and time. The data snapshot can be the data obtained or stored after estimation by a carrier phase estimator is performed and before FEC decoding is performed. At this point, the compensation for distortion in the channel (e.g. CD and Polarization Mode Dispersion) and laser frequency and phase offsets have been compensated, and primarily distortions introduced by the transmitter may remain.

The data snapshot 110A-110D can be sent back to the hub node 102 from the leaf nodes 106A-106D through the communication network 104. The data snapshot 110A-110D can be received from the leaf nodes 106A-106D through a designated feedback channel. A data snapshot can include a copy of a portion of leaf node-specific data received from and processed by the hub node 102.

The hub node 102 can compare the data snapshots 110A-110D received from the leaf nodes 106A-106D to the data the hub node 102 intended to transmit across each of the subcarriers to the leaf nodes 106A-106D. As described in more detail below, the hub node 102 can use various suitable error determining techniques, such as an adaptive least MSE technique, to determine the error and compensate data to be transmitted based on the determined error. For example, the hub node 102 can adjust transmitter filter coefficients based on the MSE values. In this manner, impairments to the data introduced by transmitter components of the hub node 102 can be compensated to improve the performance and reliability of the communication system as a whole.

Figure 2:
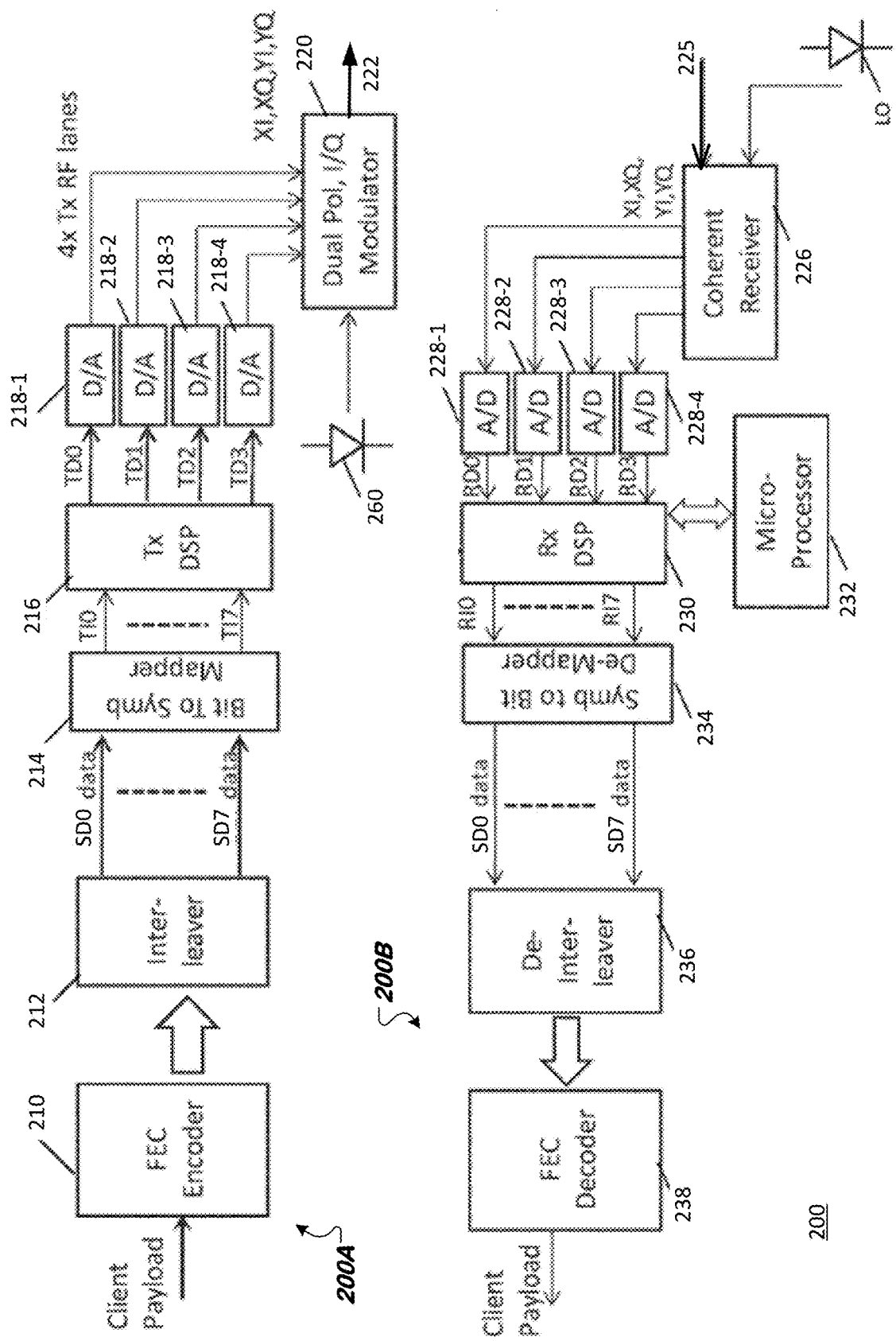
FIG. 2 depicts a block diagram of an example transmitter and receiver in a communication system.

As noted above, in some implementations, the communications network 104 may be an optical communications network. In such implementations, the hub node 102 and leaf nodes 106A-106D can include optical communication transceivers for communicating across the optical communications network. FIG. 2 illustrates a block diagram 200A of a transmitter (Tx) and a block diagram 200B of a receiver (Rx) that can be used to correct for Tx impairments. In some implementations, the Tx block diagram 200A may represent the Tx block of a hub node 102. In some implementations, the Rx block diagram 200B may represent the Rx block of a leaf node.

Referring to the Tx block diagram 200A of FIG. 2, the Tx can receive data or client payload information and such data is supplied to a forward error correction (FEC) encoder circuit that encodes the data in accordance with an FEC code. The encoded data may next be supplied to an interleaver circuit 212 that randomizes the data so that any errors that occur during transmission will be distributed upon de-interleaving (e.g., circuit 236) and will not be concentrated in a long stream, which otherwise may not be successfully corrected by the FEC decoder 238 in the receiver.

In the illustrated example, eight subcarriers are used to transmit data. In general, N subcarriers (N>1) can be used. Interleaver circuit 212 can supply output data streams SD0 to SD7, each of which is associated with a respective subcarrier. Output data streams SD0 to SD7 may be provided to a bit-to-symbol mapper 214, which outputs symbol streams TI0 to TI7, such that each symbol in a given symbol stream corresponds to a particular bit sequence in a corresponding one of data streams SD0 to SD7. Symbol streams TI0 to TI7 are next input to transmit DSP (Tx DSP) 216, which is discussed in greater detail below. Tx DSP 216 may provide multiple outputs (in the illustrated example, four outputs), each of which is supplied to a respective one of digital-to-analog converters (DACs) 218-1 to 218-4. DACS 218-1 to 218-4 can output a respective one of analog drive signals XI, XQ, YI, and YQ that drive a respective modulator 220.

In some implementations, a microprocessor (not shown) can be coupled to or integrated with the Tx DSP 216 to control overall operations of Tx DSP 216. The microprocessor can be coupled to the frame counter 112 described with respect to FIGS. 1 and 7 and may control the operating modes of the Tx DSP 216 and the frame counter 112. For example, the microprocessor can place the Tx DSP 216 in idle mode and generate alarms for a system user. The microprocessor also can generate trigger signals and instruction signals for transmission to the leaf nodes 106A-106D.

In Tx block diagram 200A, only one FEC encoder 200 is shown. However, in general, multiple FEC encoders can be used. For example, FEC encoder 210 may be a first FEC encoder and additional FEC encoders can be provided to encode a second data input. Moreover, additional interleaver circuits can be provided to interleave the encoded data output from the additional encoders to output an additional data streams to other bit-to-symbol mappers, which, in turn, provide additional sets of eight symbol streams (in addition to TI0 to TI7) in a manner similar to or the same as that described above with respect to bit-to-symbol mapper 214. Moreover, the Tx DSP 216 may include a first portion or circuit that provides the first (TD0) and second (TD1) outputs to DACs 218-1 and 218-2 based on symbol streams TI0 to TI7, respectively, and a second portion or circuit that outputs third (TD2) and fourth (TD3) outputs to DACs 218-3 and 218-4.

FIG. 3A illustrates the analog drive signals XI, XQ, YI, and YQ being supplied to modulators MZ1, MZ2, MZ3, and MZ4 that can be implemented as or include a Mach-Zehnder modulator. Light from laser 260 can be split and a first portion of such light is supplied to modulators MZ1 and MZ2. The first portion of the light can be further split such that part of the first portion of the light is supplied to modulator MZ1 to modulate the first part of the light to provide an in-phase component, for example, and another part of the first portion of the light is supplied to modulator MZ2, which modulates the other part of the first portion of the light to provide a quadrature component. The in-phase and quadrature components are then combined and supplied to a polarization beam combiner. Phase imbalance in this combination (i.e. deviation from 90 degrees) can be referred to as I/Q phase imbalance. Timing skew between the in-phase and quadrature component can be referred to as I/Q timing skew and can be detrimental to subcarrier transmission. These imbalances and skew can be compensated using the methods described in this disclosure.

A second portion of the light output from laser 260 can be supplied to modulators MZ3 and MZ4, which also may include Mach-Zehnder modulators. The second portion of the light can be further split such that part of the second portion of the light is supplied to modulator MZ3 to modulate the first part of the light to provide an in-phase (I) component, for example, and another part of the second portion of the light is supplied to modulator MZ4, which modulates the other part of the second portion of the light to provide a quadrature (Q) component. The in-phase (I) and quadrature (Q) components are then combined, and the polarization thereof is rotated, e.g., orthogonally, such that the combined I and Q components have a transverse magnetic (TM) polarization, whereas the combined I and Q components of the first portion of the light typically have a transverse electric polarization. The TM light is also supplied to the polarization beam combiner, which combines the TE modulated light and the TM modulated light into a polarization multiplexed signal and supplies such signal to optical communication path or link 222.

The frame counter 112 can be coupled to the microprocessor of a hub node 102 and can generate a trigger signal when the frame counter reaches a determined number (as explained above). When the microprocessor is operating in the snapshot mode, the microprocessor can generate a synchronization instruction message or signal in response to generation of the trigger signal. The synchronization instruction message or signal can be transmitted to leaf nodes 106A-106D simultaneously or at planned intervals, and can be transmitted on its own or piggybacked onto additional data destined for a leaf node. The synchronization instruction message or signal can include timing information and instructions for each receiving leaf node to take a data snapshot of data that was transmitted at the same time instance, and send the data snapshot back to the hub node 102.

When the microprocessor is operating in the trench line mode, the microprocessor can generate a trench data instruction message or signal in response to generation of the trigger signal. The trench data instruction message or signal can be transmitted to individual leaf nodes or all the leaf nodes 106A-106D simultaneously or at planned intervals, and can be transmitted on its own or piggybacked onto additional data destined for a leaf node. The trench data instruction message or signal can include instructions for each receiving leaf node to determine trench data (as described below in more detail with respect to FIGS. 7-13B) and send the trench data back to the hub node 102.

The polarization multiplexed signal output by the modulator 220 can propagate along communication path 222. In some implementations, the communication path 222 can be an optical communication path that includes one or more segments of optical fiber and one or more optical amplifiers. The optical communication path 222 can be part of the communication network 104 (or connections thereto) shown in FIGS. 1 and 7.

Figure 3B:
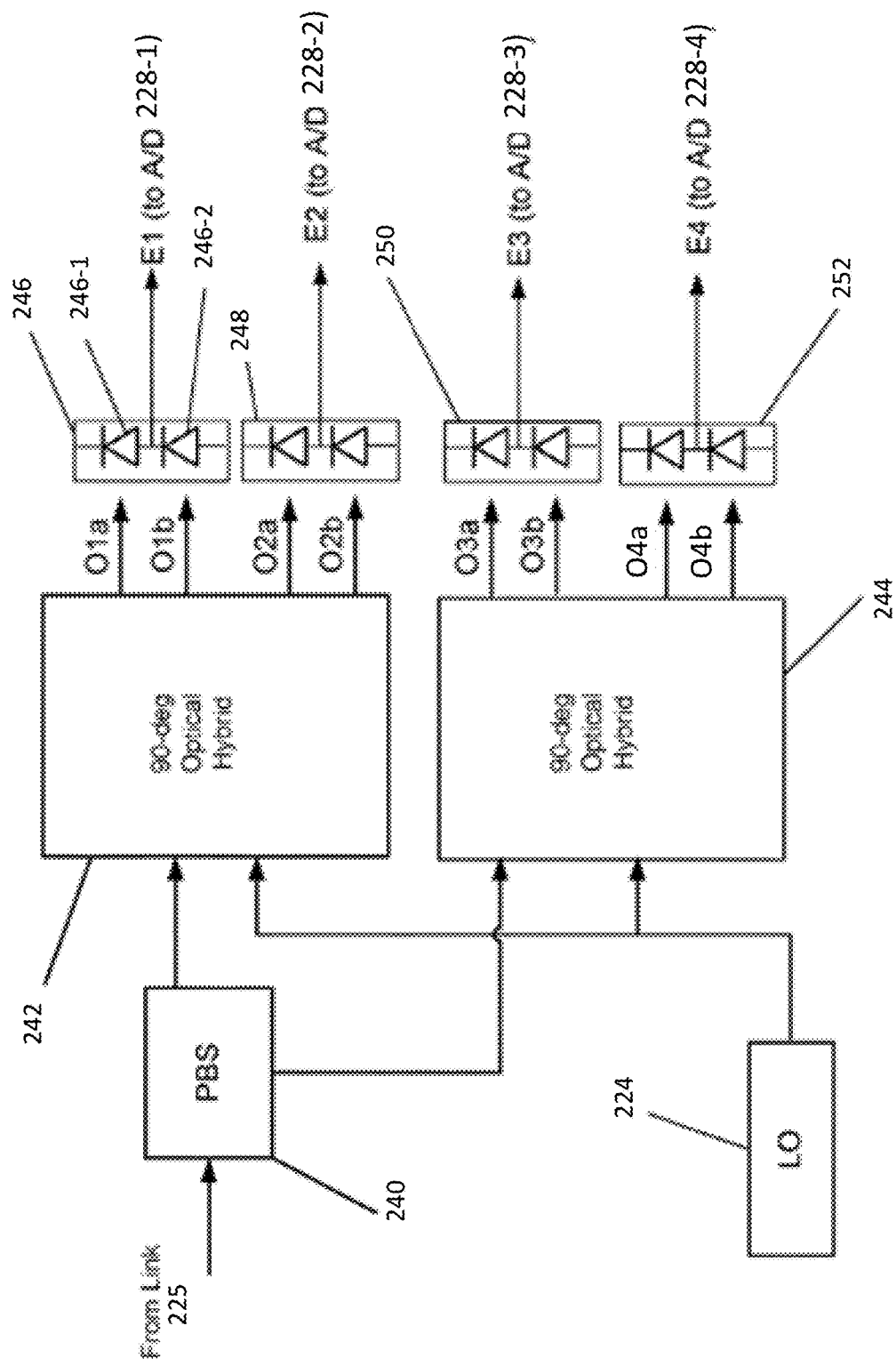
FIG. 3B depicts a block diagram of an example coherent receiver.

After traversing the communication path 222, the transmitted signal (including subcarriers therein) may be received by a receiver represented by Rx block diagram 200B. Referring to FIGS. 2 and 3B, a coherent receiver 226 can receive the signal received from link 225. The coherent receiver 226 can include a polarization beam splitter (PBS) 240 operable to receive a polarization multiplexed optical signal and to separate the signal into X (TE) and Y (TM) orthogonal polarizations, i.e., vector components of the optical E-field of the incoming optical signals received from the optical communication path 222. The orthogonal polarizations are then mixed in 90-degree optical hybrid circuits ("hybrids") 242 and 244 with light from local oscillator (LO) laser 224 having a wavelength, for example, approximately equal to, the wavelength of the polarization multiplexed optical signal.

Hybrid circuit 242 can output, for example, four mixing products or optical signals O1a, O1b, O2a, O2b, and hybrid circuit 244 can output four optical signals or mixing products O3a, O3b, O4a, O4b, each representing the in-phase (XI, YI) and quadrature (XQ, YQ) components of the optical E-field on the X (TE) and Y (TM) polarizations, and each including light from local oscillator 224 and light from polarization beam splitter 240. Optical signals O1a, O1b, O2a, O2b, O3a, O3b, O4a, and O4b are supplied to a respective one of photodetector circuits 246, 248, 250, and 252. Each photodetector circuit may include a pair of photodiodes (such as photodiodes 246-1 and 246-2) configured as a balanced detector, for example, and each such photodetector circuit can supply a corresponding one of the electrical signals E1 (corresponding to XI), E2 (corresponding to XQ), E3 (corresponding to YI), and E4 (corresponding to YQ) to a respective one of ADCs 228-1 to 228-4. Alternatively, each photodetector can include one photodiode (such as photodiode 246-1) or a single-ended photodiode. Electrical signals E1 to E4 are indicative of data carried by the polarization multiplexed optical signal input to PBS 240. For example, these electrical signals may comprise four base-band analog electrical signals linearly proportional to the in-phase (XI, YI) and quadrature (XQ, YQ) components of the optical E-field on X and Y polarizations.

As further indicated by FIG. 2, ADCs 228-1 to 228-4 can convert the XI, XQ, YI, and YQ analog signals into corresponding series of digital samples RD0 to RD3. Each series or stream of digital samples can be supplied to a receiver (Rx) DSP 230, which is discussed in greater detail below. Rx DSP 430, in turn, can output, in this example, eight streams of symbols (RI0 to RI7) carried by the polarization multiplexed optical signal to symbol to bit de-mapper circuit 234. Next, de-mapper circuit 234 can output streams of bits or data sequences SD0 to SD7 such that each sequence corresponds to a particular symbol output from Rx DSP 430. The data or bit sequences are then de-interleaved by de-interleaver circuit 236 and the de-interleaved data is the subject to FEC decoding by decoder circuit 238 to yield the client payload data.

A microprocessor 232 can be coupled to or integrated with the Rx DSP 230 to control overall operations of Rx DSP 230. After processing signals from one or more transmission sources, the microprocessor 232 can determine when and how to respond to the synchronization or trench data instruction message or signal when received. For example, in some implementations, at the time specified by the synchronization instruction message or signal, the microprocessor 232 can store a data snapshot of the data received over the designated subcarrier at the specified time, and control a transmitter to transmit the data snapshot back to the hub node or transmission source. In some implementations, the microprocessor 232 can implement operations (described in more detail in FIGS. 7-13B) to collect and determine trench data to be transmitted back to the hub node in response to receiving a trench data instruction message.

Figure 4:
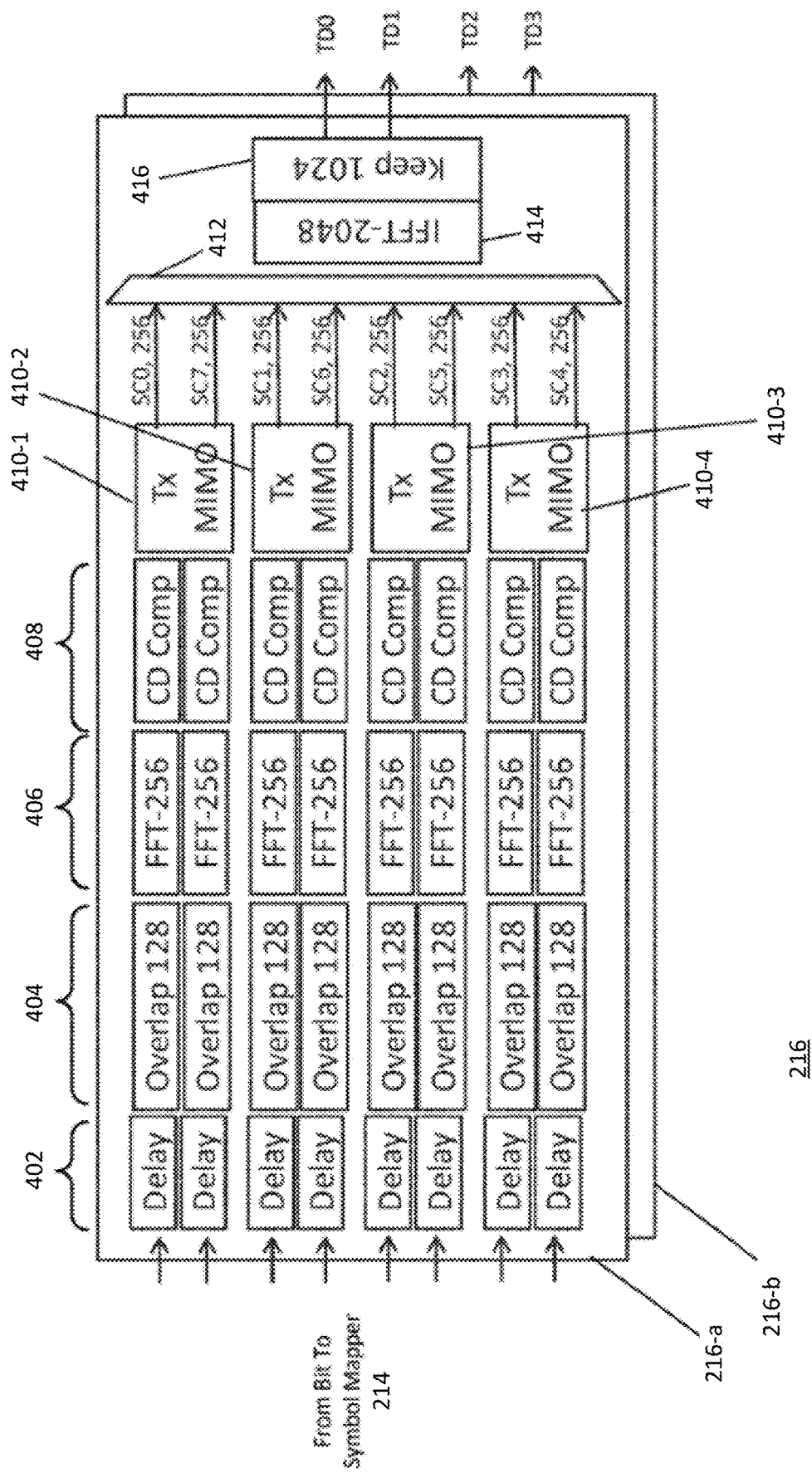
FIG. 4 depicts a block diagram of an example digital signal processor (DSP) in a transmitter.

With reference to the transmitter system of FIG. 2, FIG. 4 shows a first portion (labeled 216-a) of Tx DSP 216 in greater detail. As noted above, DSP portion 216-a provides outputs TD0 and TD1 to DACs 218-1 and 218-2, respectively, and DSP portion 216-b provides outputs TD2 and TD3 to DACs 218-3 and 218-4, respectively. DSP portion 216-b has the same or similar structure as DSP portion 216-a.

DSP portion 216-a can include multiple delay circuit or buffers 402, each of which receives a corresponding one of symbol streams TD0 to TD7 from interleaver circuit 214. The delay circuits, in turn, can output a respective one of these data streams to a corresponding one of overlap buffer circuits 404, each of which are configured to output a respective symbol stream, preferably without any gaps or interruptions in the such symbol stream. Overlap buffer circuits 404 can provide a respective output to a corresponding one of FFT circuits 406, each of which converts the overlap buffer circuit 404 from the time domain to the frequency domain. Such conversion to the frequency domain can advantageously reduce power consumption compared to when operations are performed in the time domain.

The frequency domain outputs from the FFT circuits 406 are next subject to chromatic dispersion (CD) compensation by a respective one of circuits 408, such that resulting analog drive signals XI, XQ, YI, and YQ drive the modulators in such a way that the resulting optical signals pre-compensate for chromatic dispersion along optical communication path 222. Each of CD compensation circuits 408 may include a respective finite-impulse response filter.

The CD compensation circuits 408 can supply outputs to a corresponding one of transmit side multiple-input multiple output (Tx MIMO) circuits 410-1 to 410-4 (collectively referred to herein as "Tx MIMO circuit 410"). In one example, the MIMO circuits can be implemented as 2×2 MIMO circuits. Each Tx MIMO circuit 410 can include compensation circuitry (e.g., filters) configured to correct impairments associated with the analog path variations noted above. Each Tx MIMO circuit 410 can output pairs of data streams, each pair being associated with a corresponding pair of subcarriers. For example, Tx MIMO circuit 410-1 can output data streams SC0 and SC7 associated with corresponding subcarriers 0 and 7. Tx MIMO circuit 410-2 can output data streams SC1 and SC6 associated with corresponding subcarriers 1 and 6. Tx MIMO circuit 410-3 can output data streams SC2 and SC5 associated with corresponding subcarriers 2 and 5. Tx MIMO circuit 410-4 can output data streams SC3 and SC4 associated with subcarriers 3 and 4, respectively.

Figure 5:
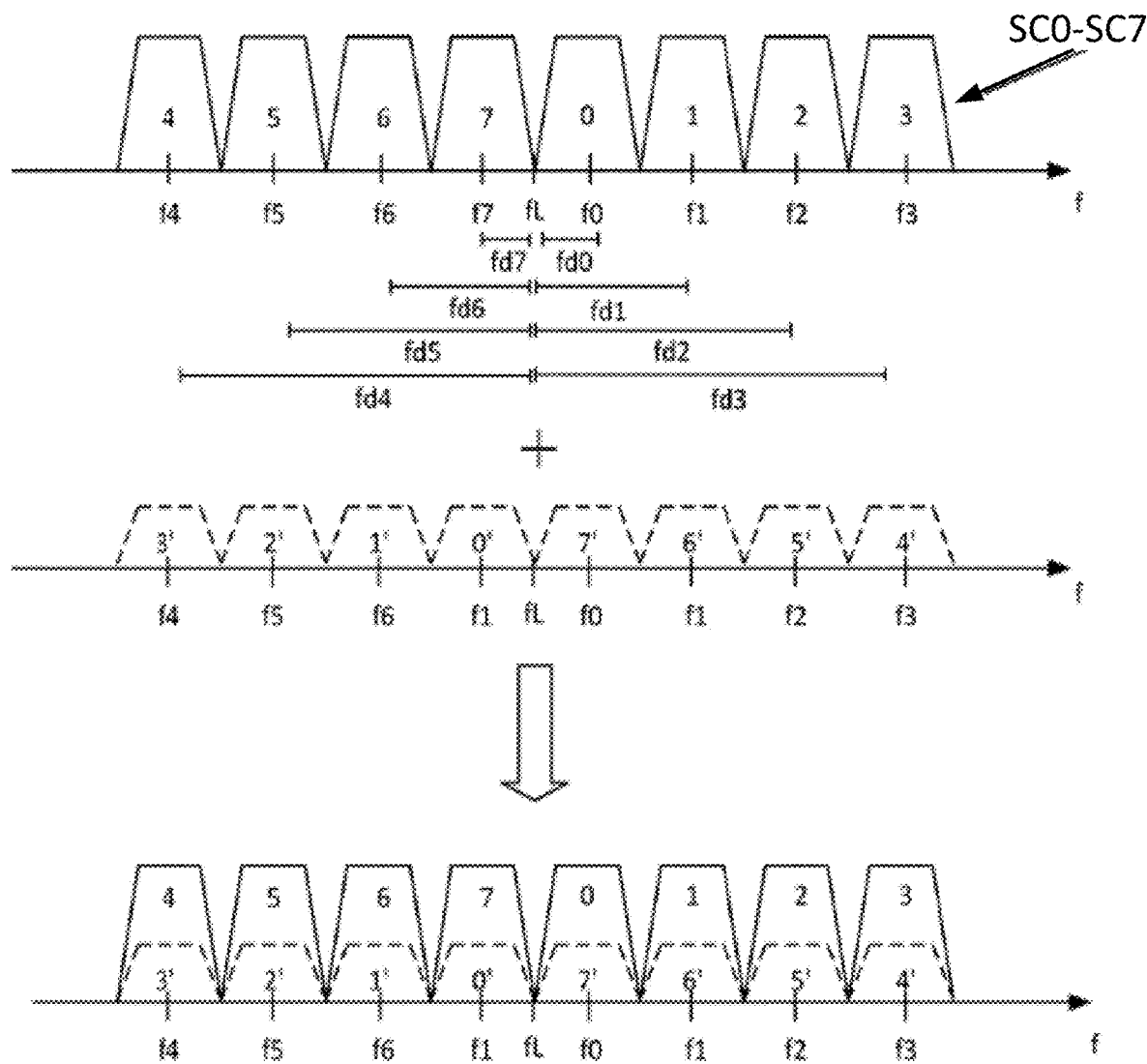
FIG. 5 depicts an example of subcarriers with and without signal impairment.

Examples of the pairs of subcarriers are shown in FIG. 5. Subcarriers SC0-SC7 have frequencies f0 to f7, respectively. Frequencies f0 to f3 are provided above and spaced from laser frequency fL by a corresponding spectral distance of fd0 to fd3, and frequencies f4 to f7 are provided below and spaced from laser frequency fL by a respective one of spectral distance of fd4 to fd7. Frequencies f0 and f7 are symmetric relative to laser frequency fL; frequencies f1 and f6 are symmetric relative to laser frequency fL; frequencies f2 and f5 are symmetric relative to laser frequency fL; and frequencies f3 and f4 are symmetric relative to laser frequency fL. In this example, fd0 equals fd7, fd1 equals fd6, fd2 equals fd5, and fd3 equals fd4.

The subchannel bandwidth associated with each of the subcarrier pairs can be the same. In one example, the subcarriers shown in FIG. 5 may be Nyquist subcarriers, each of which may have a frequency spacing equal to or slightly larger than the individual subcarrier baud-rate.

While generating the various subcarrier frequencies, analog circuitry can introduce non-idealities such that cross-channel noise and interference can be generated. For example, each subcarrier may generate noise at an opposite frequency relative to the center laser frequency fL, e.g., where the subcarrier's Hermitian pair is spectrally located. Accordingly, as shown in FIG. 5, subcarrier 3 at frequency f3 may have associated noise 3' at corresponding "negative" frequency f4, and subcarrier 4 at frequency f4 may generate noise 4' at corresponding negative frequency f3. Similarly, subcarriers 0, 1, and 2 may have associated respective noise 0', 1', and 2' at corresponding to "negative" frequencies f7, f6, and f5 opposite laser frequency fL. In addition, subcarriers 5, 6, and 7 may have associated respective noise 5', 6' and 7' at corresponding negative frequencies f2, f1, and f0. Such frequencies are termed "negative" frequencies with respect to frequencies f5, f6, and f7, respectively, because frequencies f2, f1, and f0 are opposite laser frequency fL. In FIG. 5, noise portions 3', 2', 1', 0', 7', 6', 5', and 4' have been added to model interference with subcarriers 4, 5, 6, 7, 0, 1, 2, and 3, respectively, thereby impairing performance or increasing errors in each of these subcarriers.

As further shown in FIG. 4, data streams SC0 to SC7 (inclusive of possible impairments as described above) can be fed to multiplexer 412, which combines and supplies the data streams at a common output. The combined data streams can be provided to an inverse FFT circuit (IFFT) 414, which converts the data streams into the time domain, and the output of the IFFT 414 can be provided to a buffer circuit 416, which supplies outputs TD0-TD3 to DACs 218-1 to 218-4, respectively. As described above with respect to FIG. 2, each of DACS 218-1 to 218-4 can output a respective one of analog drive signals XI, XQ, YI, and YQ that drive a respective modulator 220.

Figure 7:
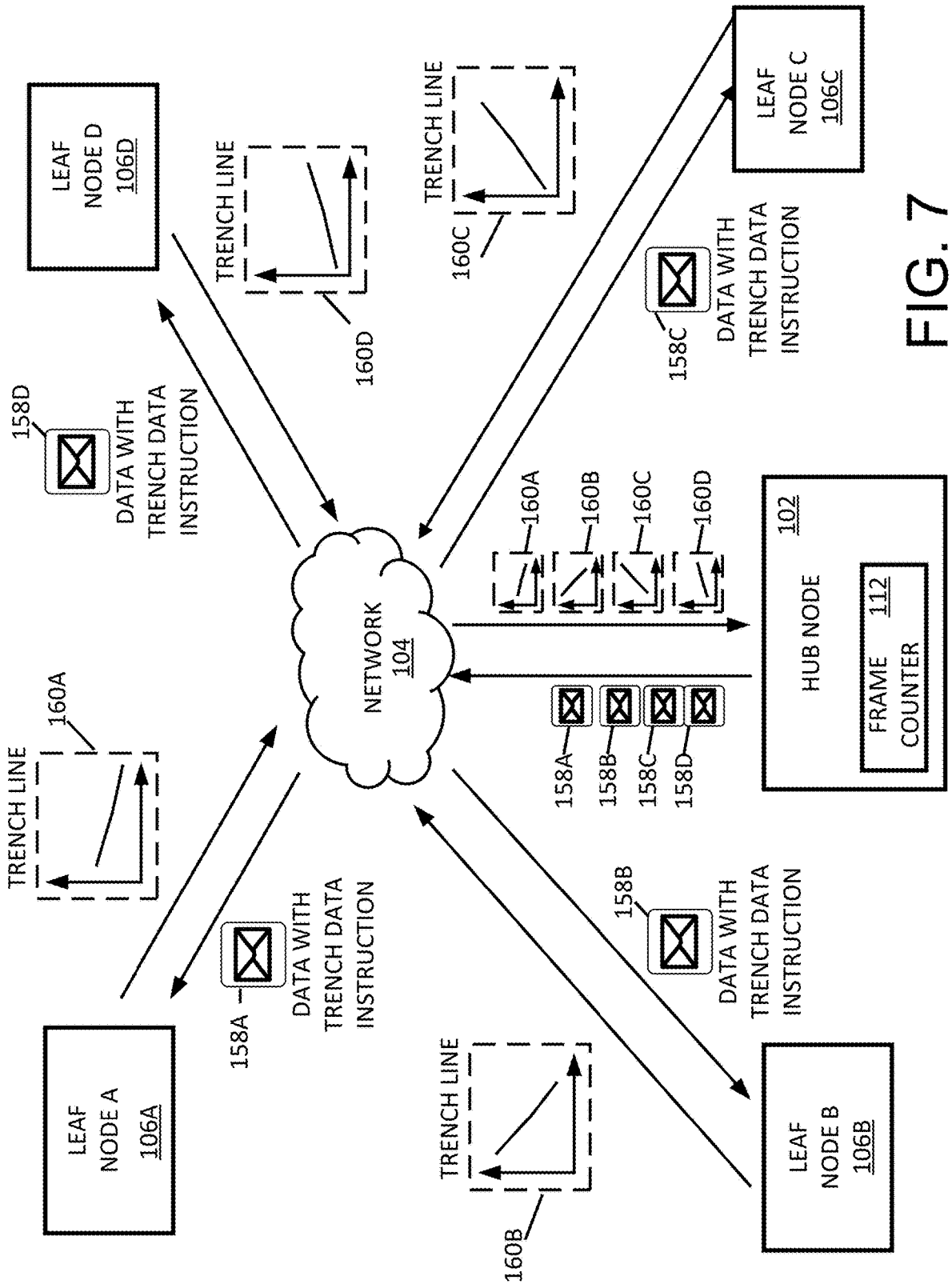
FIG. 7 depicts an example of a communication system that provides trench line feedback data for performing impairment compensation.

The modulator 220 can supply the multiplexed signal with the multiple subcarriers to optical communication path or link 222. In a point-to-multipoint communication system such as the one illustrated in FIGS. 1-2, each leaf node 106A-106D can be allocated a particular subchannel and subcarrier. The allocation can be made in pairs. For example, leaf node A can be allocated a subchannel SCH0 associated with subcarrier 0. Leaf node D can be allocated a subchannel SCH7 associated with subcarrier 7. Leaf node B can be allocated a subchannel SCH1 associated with subcarrier 1. Leaf node C can be allocated a subchannel SCH1 associated with subcarrier 6. Accordingly, data packet 108A (FIG. 1) or data packet 158A (FIG. 7) can be transmitted to leaf node A using subcarrier 0. Data packet 108B (FIG. 1) or data packet 158B (FIG. 7) can be transmitted to leaf node B using subcarrier 1. Data packet 108C (FIG. 1) or data packet 158C (FIG. 7) can be transmitted to leaf node C using subcarrier 6. Data packet 108D (FIG. 1) or data packet 158D (FIG. 7) can be transmitted to leaf node D using subcarrier 7. Although only four nodes are shown in FIGS. 1 and 7, it should be understood that more than four nodes can be implemented.

As explained above, in generating the data streams, one or more transmitter components may generate impairments, such as the cross channel interference between subchannels SOHO and SCH7 due to noise 7' and 0'. As a result, a data stream that reaches a particular leaf node may undesirably receive data that includes noise and signal impairments. For instance, data received by leaf node A may include noise 7' due to the cross-channel interference of subchannel SCH7. Similarly, data received by leaf node D may include noise 0' due to the cross-channel interference of subchannel SCH0. The data, e.g., data snapshot 110A-110D or trench line data 160A-160D, which is sent back to the hub node 102 from the leaf nodes 106A-106D is received by the hub node 102 to compensate for such impairments. In general, various suitable methods can be used to compensate for the impairments.

Figure 6:
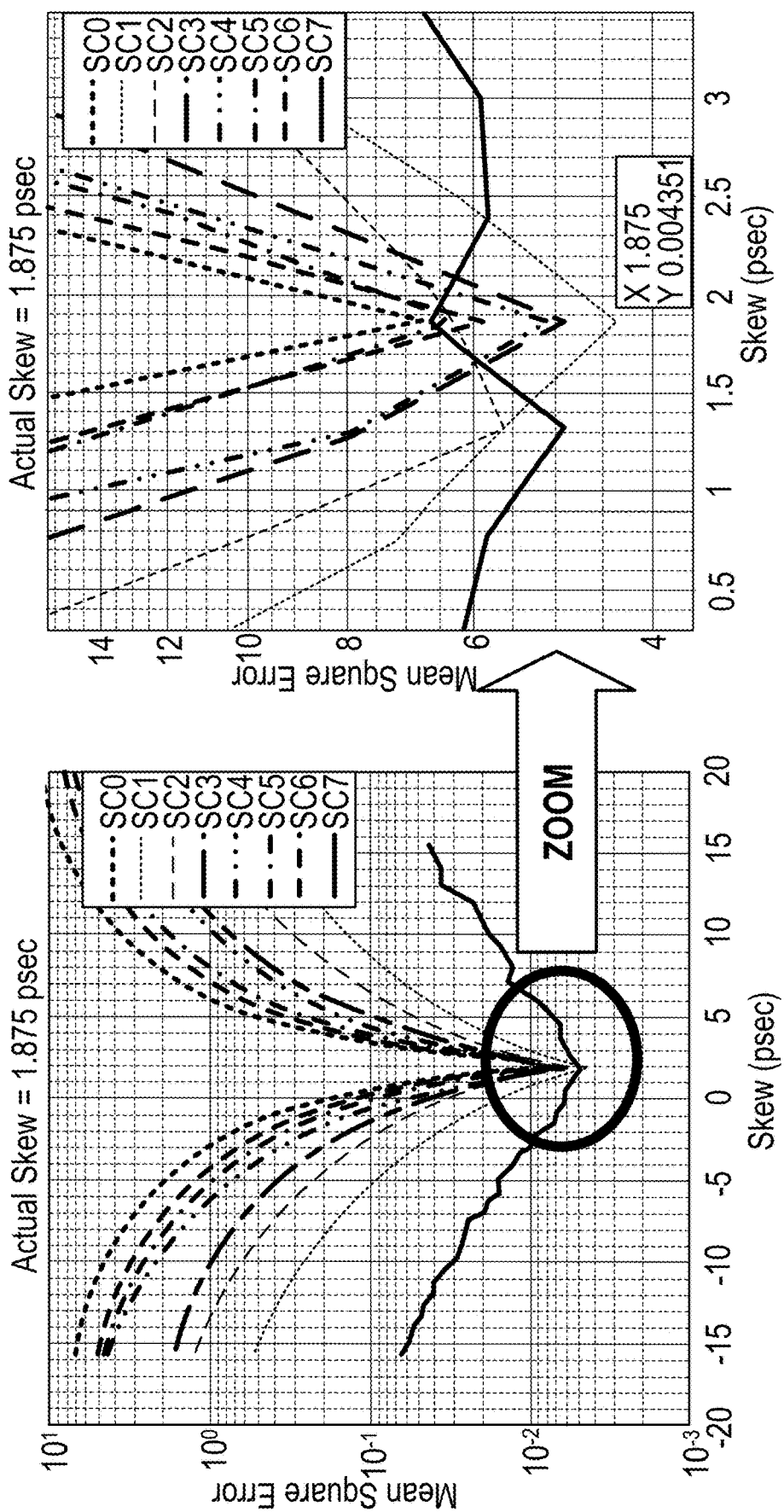
FIG. 6 depicts an example of actual skew across multiple subcarriers in a 16 subcarrier system.

An example of the impact of errors due to Tx I/Q skew is shown in FIG. 6, which shows the MSE values for subcarriers SC0-SC7 in a 16 subcarrier system with no quadrature error. In FIG. 6, a minima of the MSE for the subcarriers is at about 1.875 seconds indicating that the actual skew is about 1.875 seconds. Subcarrier SC7 is one of the outer most sub-carriers and has the sharpest vertical curve suggesting that it has greater error that the other subcarriers and may have been substantially impacted by noise and Tx impairments. In contrast, subcarrier SC0 has the flattest curve relative to the curves of the other subcarriers suggesting that SC0 may have the least sensitivity to noise and Tx impairments relative to other subcarriers.

Furthermore, in the trench line mode and as explained in more detail with respect to FIGS. 7-13B, errors related to I/Q timing skew, I/Q quadrature-error, and I/Q gain imbalance can be determined. Based on the determined errors, coefficients of the compensation circuitry can be adjusted and used to perform impairment compensation.

Another example implementation of impairment compensation is shown in FIG. 7 and occurs when the hub node 102 operates in the trench line mode. The nodes 102, 106A-106D shown in FIG. 7 are the same as the nodes shown in FIG. 1. However, the method for impairment compensation does not rely on acquiring data snapshots and instead uses trench line data provided by the leaf nodes 106A-106D. Advantageously, in this implementation, impairment compensation can be performed even when information regarding a mirrored subcarrier (also referred to as Hermitian pair) is not available and when the leaf nodes are in different geographical locations.

In more detail, the hub node 102 in FIG. 7 can transmit instructions (see data packets 158A-158D) to the leaf nodes 106A-106D to provide subcarrier trench line data. The trench data instructions can be sent continuously or periodically at the same time or at different times to the leaf nodes 106A-106D. In some implementations, the hub node 102 can allocate one subcarrier to each leaf node 106A-106D and communicate with the leaf node 106A-106D using the respective allocated subchannel.

The data packets 158A, 158B, 158C, 158D can include data intended for each leaf node along with the trench data instructions. The trench data instructions can convey timing information in various suitable ways. For example, in some implementations, the trench data instructions can include a particular date and time at which the trench data of a subcarrier associated with the receiving leaf node is to be taken. In some implementations, the trench data instructions can include a particular pulse type, and, upon receipt of the particular pulse type, the receiving leaf node(s) can be configured to execute operations to collect and report trench data.

In response to receiving the trench data instructions to provide subcarrier trench line data, a leaf node 106A, 106B, 106C, or 106D can capture frame alignment sequence (FAS) data, such as frame headers received from the hub node, and determine the subcarrier trench line data from the captured data, as explained in more detail below. The subcarrier trench line data 160A-1060D can be transmitted to the hub node 102 from each of the lead nodes 106A-106D and subsequently processed by the hub node 102 to perform impairment compensation.

Figure 9:
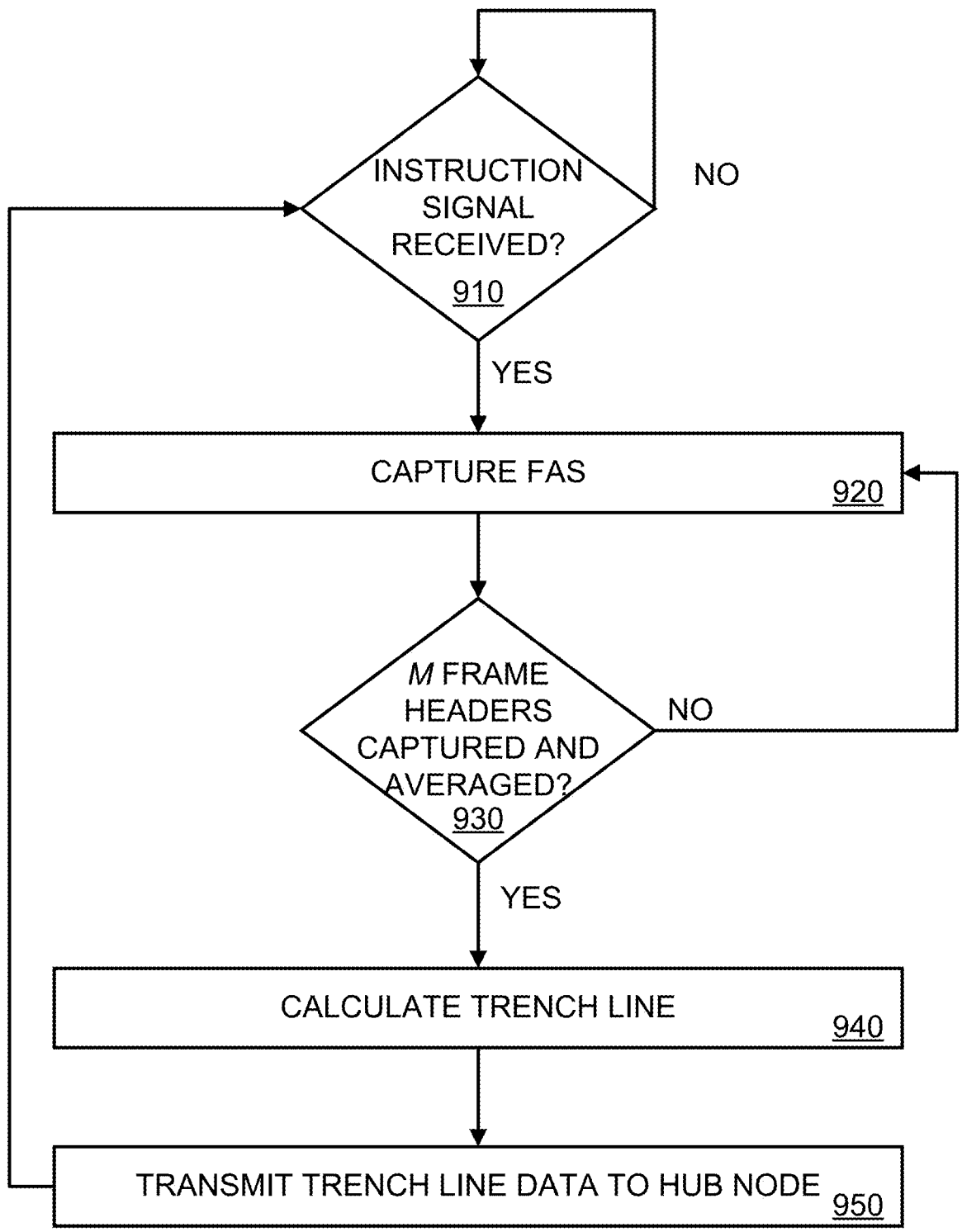
FIG. 9 depicts an example flowchart of operations performed by a leaf node.

FIG. 9 illustrates operations performed by any leaf node 106A-106D in accordance with some implementations (e.g., the implementation shown in FIG. 7). Each leaf node can include one or more processors (e.g., microprocessor 232 or Rx DSP 230 in FIG. 2) coupled to a storage device (e.g. memory) to execute the operations shown in FIG. 9. In operation 910, the leaf node can be on standby and wait for an instruction signal from the hub node 102 to be received. The leaf node can perform a check for the instruction signal periodically, at predetermined times, or continuously. If no instruction signal is received, then the leaf node can remain on standby.

If the leaf node determines that it has received an instruction signal from the hub node 102, the leaf node can capture FAS data (operation 920). To capture FAS data, the leaf node captures M subcarrier frame headers transmitted in the data received from the hub node 102. M is any positive number larger than two and can be set according to a designer or operator of the leaf node. In general, M may be a large number (e.g., more than 50), so that a large number of subcarrier frame headers can be captured and stored in a memory or buffer in the leaf node.

The leaf node can include a counter to count the number of subcarrier frame headers that have been captured and stored. After a subcarrier frame header is captured and stored, the counter increases its count by one. The leaf node is configured to continue to capture subcarrier frame headers until M subcarrier frame headers have been captured (operation 930). When M subcarrier frame headers are captured, the M subcarrier frame headers are averaged to generate an average subcarrier frame header. Averaging the subcarrier frame header is an effective way of removing the effect of noise in the subcarrier frame headers. The average subcarrier frame header is then used to calculate a trench line for the leaf node, as described in more detail in FIG. 10 (operation 940).

Because each leaf node is allocated one subcarrier across which communications from the hub node 102 are received, the subcarrier frame headers captured and averaged in operations 920 and 930 are determined for a single subcarrier. Data for a corresponding Hermitian pair subcarrier frame header is not available. The processor in the leaf node therefore generates the corresponding Hermitian pair subcarrier frame header to facilitate with processing and determining MSE, as explained below.

Figure 10:
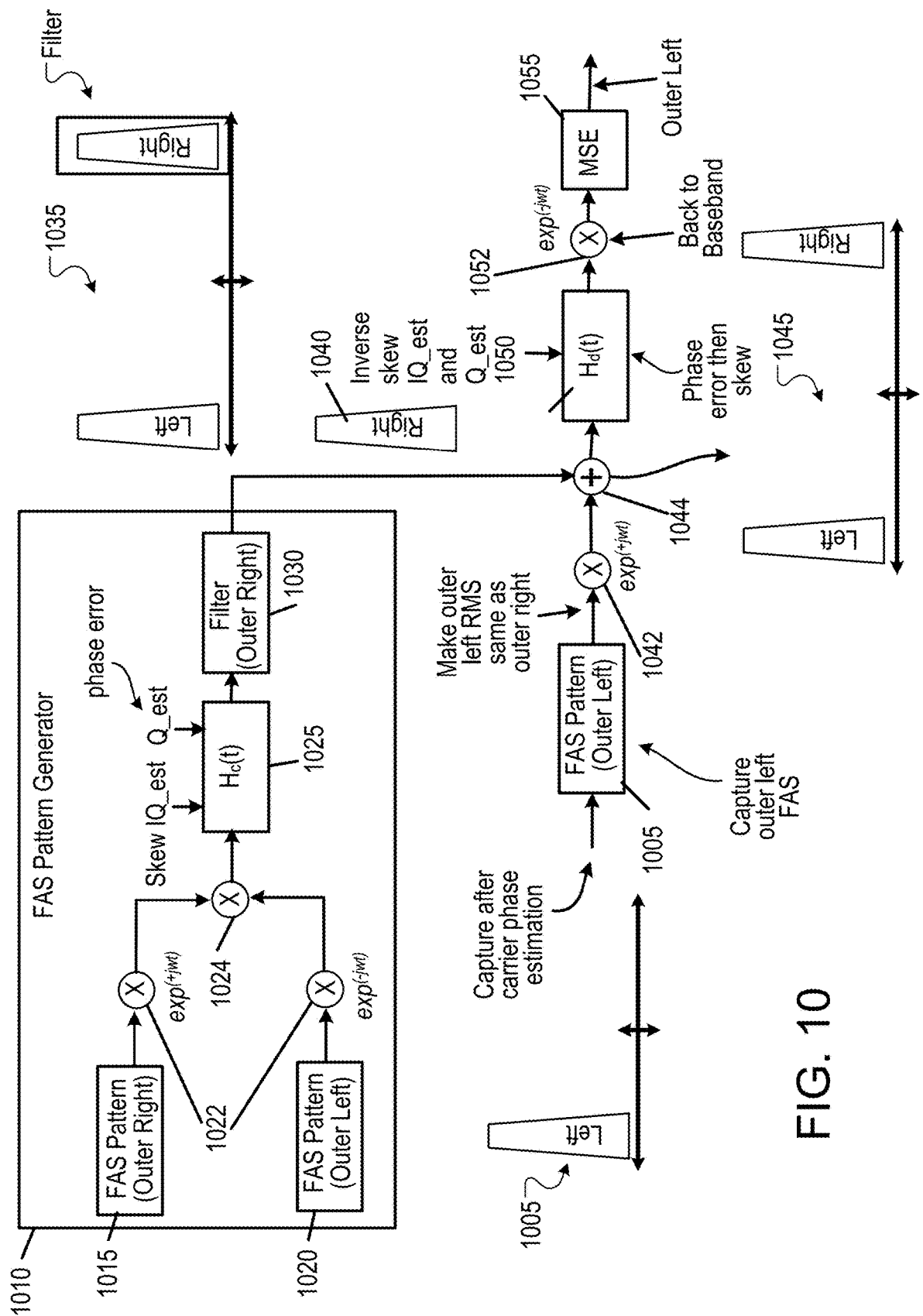
FIG. 10 depicts an example signal processing diagram for a leaf node to determine a MSE.
Figure 11:
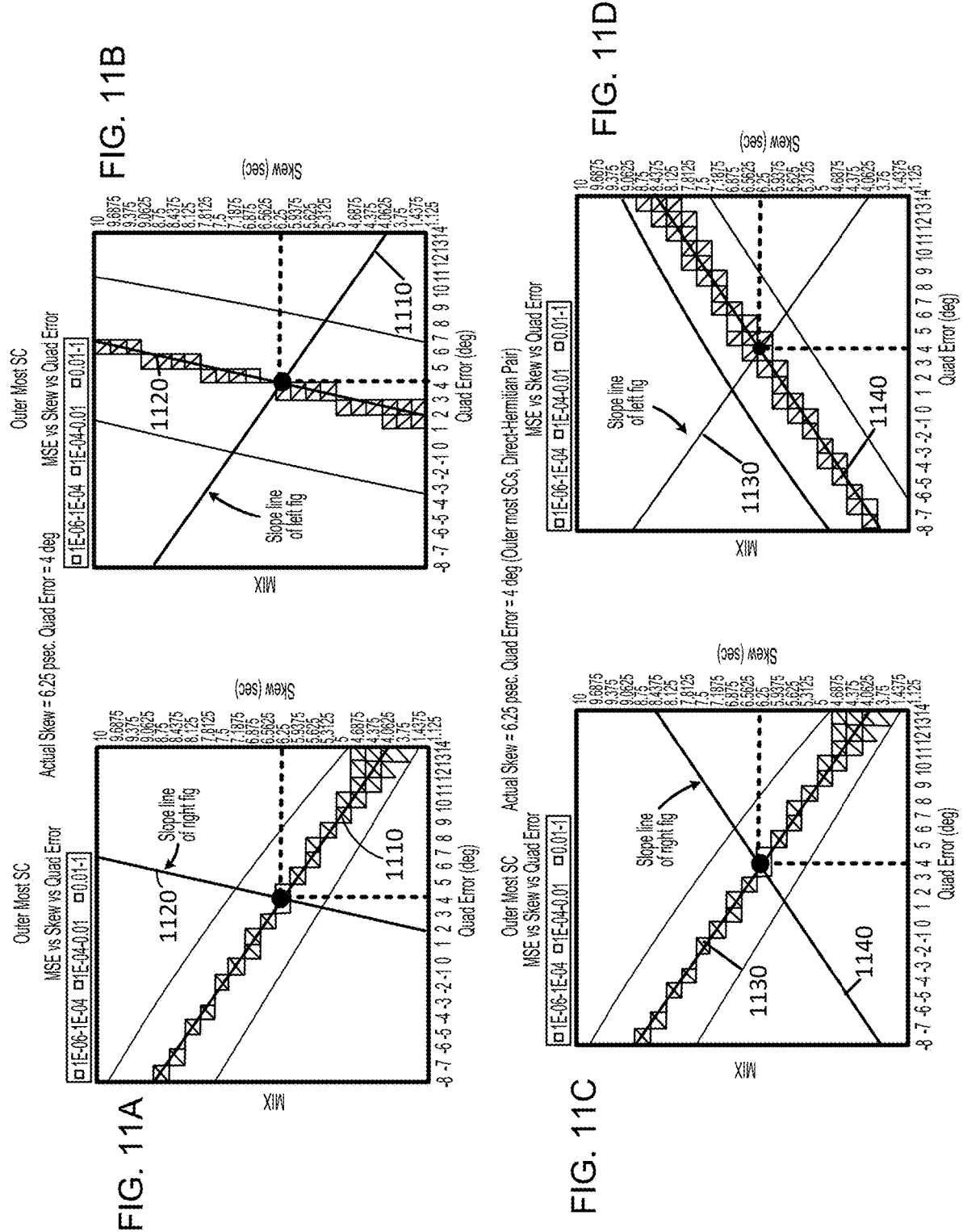
FIGS. 11A-11D depict examples of subcarrier skew versus quadrature error trench lines.

FIG. 10 depicts a system within a leaf node used to determine the mean squared error based on the average subcarrier frame header. Data 1005 in FIG. 10 is an example representation of the FAS pattern corresponding to the averaged subcarrier frame header. In the example shown in FIG. 10, the FAS pattern is an outer left pattern located at the subcarrier band allocated to the leaf node. In general, the operations in the trench line mode can be applied to any FAS pattern at any suitable location.

A synthetic FAS pattern generator 1010 can be part of the processor in the leaf node and can be configured to generate mirrored subcarrier pairs to mimic the analog signal at the output of the hub node 102's transmitter. In more detail, the FAS pattern generator 1010 can generate a pair of the outer right 1015 and outer left FAS patterns 1020 (see e.g., patterns SC3 and SC4 IN FIG. 5). The FAS pattern generator 101 can be trained to generate FAS patterns that are associated with particular subcarriers and leaf nodes since the patterns from all subcarriers are known in advance. Thus, the FAS pattern generator 1010 can generate the outer right 1015 and outer left FAS patterns 1020 according to the subcarrier allocated to the leaf node in which the FAS pattern generator 101 is located in. Generally, when the subcarrier pairs that are the furthest distance apart from each other are generated and used, better results for compensating impairments can be obtained.

The FAS patterns 1015 and 1020 can be modulated (1022) to their respective carrier frequencies and summed (1024) to yield a Hermitian pair of subcarriers 1035. The FAS pattern generator 101 can be configured to sweep through a range of phase error values so that a MSE curve can be generated over a range of skew and quadrature error values. Accordingly, for each iteration, one set of values of the skew and quadrature-error can be added to the synthetically generated subcarrier pairs through filter Hc(t) (1025), and a band pass filter 1030 can be applied to the subcarrier pair to isolate the FAS pattern 1040 that is the Hermitian data corresponding to the captured and averaged subcarrier frame header data. Hc(t) can be expressed as:

$$H_c(t) = [I(t-\tau/2) + Q(t+\tau/2)]e^{j(\omega + \pi/2)}$$

where I and Q corresponds to in-phase and quadrature signals, respectively. T is the IQ skew and ⓠ is the phase-error. For filter Hc(t), first skew is added and then phase error is added.

Meanwhile, the FAS pattern 1005 corresponding to the average subcarrier frame header is modulated (1042) to its respective carrier frequency and added (1044) to the synthetically generated FAS pattern 1040 to yield a Hermitian pair of subcarriers 1045. Next, the inverse of the skew and quadrature-error added at filter Hc(t) can be added to the subcarrier pair 1045 at filter $H_d(t)$ (1050) which can be expressed as:

$$H_d = e^{-j(\omega + \pi/2)}[I(t+\tau/2) + Q(t-\tau/2)]$$

For $H_d(t)$, phase error is first added and then skew error is added.

The Hermitian pair with added error can then be demodulated (1052) down to baseband. The MSE can be calculated (1055) between the impaired header symbols and known header symbols for the received subcarrier 1005. When the artificially added/subtracted skew and quadrature-error becomes equal to the Tx side skew and quadrature-error, minima of MSE can give an indication of the impairments. For example, as shown in FIG. 6 above, the MSE minima indicated an actual skew of about 1.875 seconds.

However, in mapping swept skew and quadrature-error over a two-dimensional space, there is no single minimum MSE, rather, a "slope" of trench lines that correspond to multiple minimum MSE values can be plotted such that the I/Q skew and quadrature error may not be determinable by measurements from a single sub-carrier. Data describing a trench line and its slope is the data requested by the hub node 102 and sent to the hub node 102 from a leaf node through one of the data packets 158A-158D (FIG. 7) back to the hub node 102. The hub node 102 collects such trench line data from multiple leaf nodes and determines the estimated skew and quadrature error as described below.

In particular, when trench lines associated with one subcarrier (associated with one leaf node) are plotted on top of trench lines associated with another subcarrier (associated with another leaf node), the point of intersection of these slope lines can provide an indication of the estimated skew and quadrature error.

For example, FIG. 11A depicts a MSE minima or trench line 1110 for an outer most subcarrier (e.g., SC3 in FIG. 5). FIG. 11B depicts a MSE minima or trench line 1120 for an innermost SC (e.g., SC7 in FIG. 5). FIGS. 11C and 11D depict the trench lines 1130 and 1140 for a Hermitian pair of the outer most subcarriers (e.g., SC3 and SC4 in FIG. 5). When two lines are superimposed on each other, they intersect at a point indicating the actual added skew and quadrature-error. In the illustrated example, the actual added skew and quadrature-error are 6.25 psec and 4 degs, respectively. In general, the slope of each subcarrier data is inversely proportional to the subcarrier center frequency and can be determined using the following equation:

$$\frac{\tau_{ps}}{ⓠ_{deg}} = \frac{10^{12}}{180.2 \cdot f_c}$$

In some implementations, instead of calculating the MSE for the whole 2D plane, as shown in FIGS. 11A-11D, hub node 102 calculations can be simplified by determining an orthogonal slope to the known trench line slope. In general, the trench line slope for a subcarrier is known. For instance, using the equation above, the slope of the subcarrier can be determined from the subcarrier's center frequency. However, it is not known where within the 2D plane the trench line slope is located. Moreover, with temperature variations and aging skew/quadrature-error can drift.

Figures 8A, 8B:
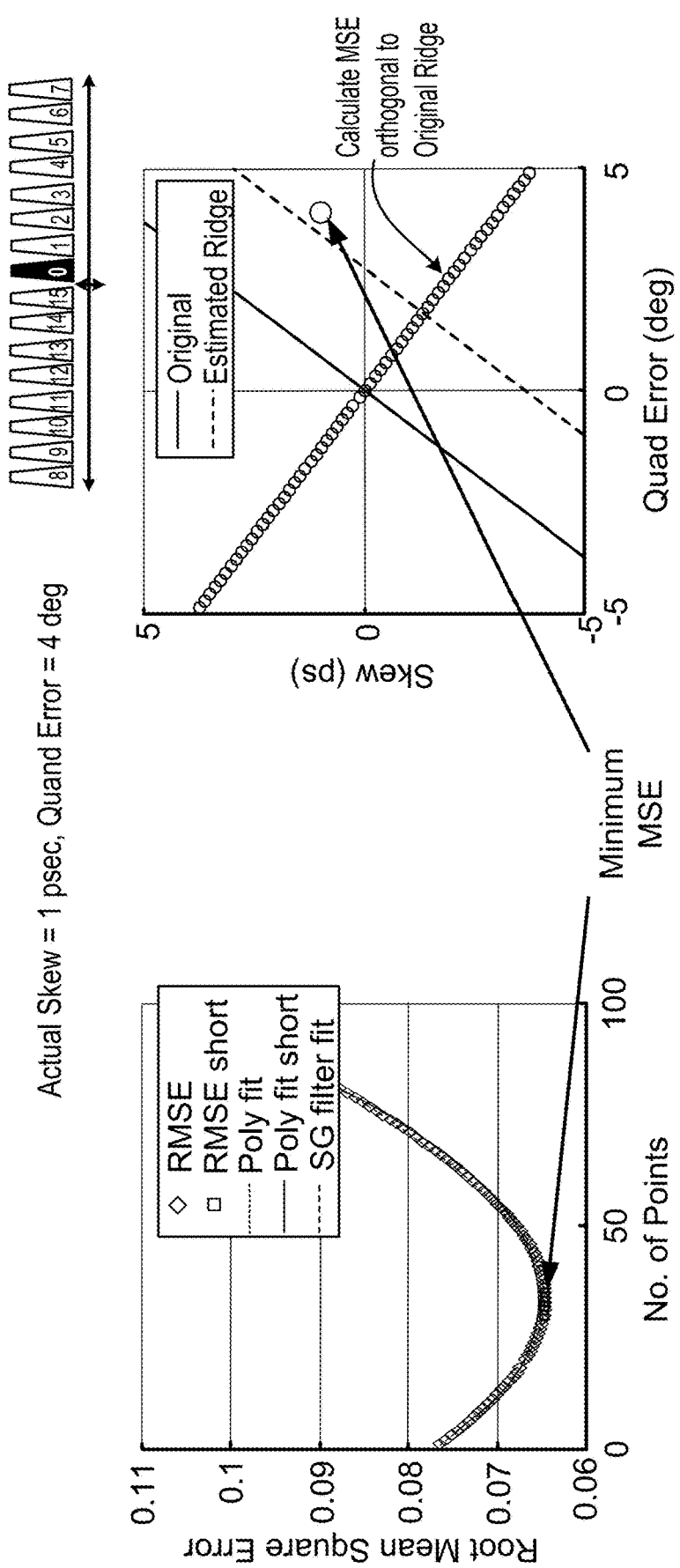
FIGS. 8A and 8B depict example data plots for determining a MSE minima using single subcarrier slope data.

FIGS. 8A and 8B show how a more simplified solution can be implemented without calculating the MSE for the whole 2D plane. In the example depicted in FIGS. 8A and 8B, characteristics of a subcarrier SC0 in a 16 subcarrier communication system are shown. Using the center frequency of SC0, a slope as shown in FIG. 8B can be generated. For each point on the slope, a set of points orthogonal to the slope and point can also be determined (shown by the dotted line). The MSE orthogonal to SC0 slope at each point on the slope can be calculated and corresponding MSE can be plotted, as shown in FIG. 8A, to determine at which point the MSE is at a minimum. After locating the minimum, the leaf node can report the MSE, skew, quad error at the minima through data packets 160A-160D (FIG. 7) back to the hub node 102 (operation 950 in FIG. 9) to be used for impairment compensation purposes. The leaf node may transmit the data in various suitable ways. For example, in some implementations, the leaf can report the equation of the trenchline. And since the slope is known, the hub can calculate the intersection of lines from a plurality of subcarriers.

Figure 12:
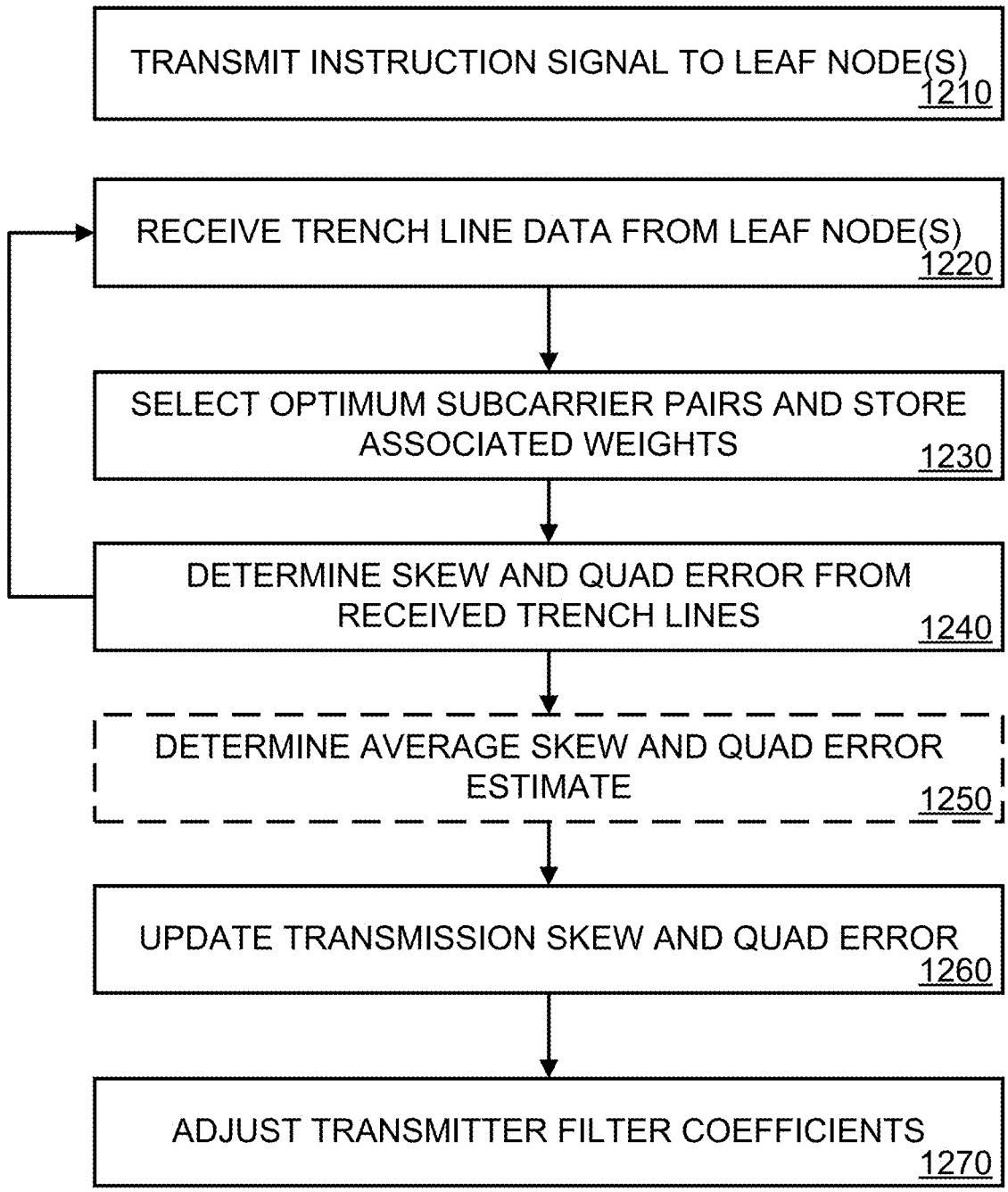
FIG. 12 depicts an example flowchart of operations performed by a hub node.

FIG. 12 depicts operations performed by the hub node 102 in the trench line mode in accordance with some implementations. After the hub node 102 transmits the instruction signal(s) to one or more leaf nodes 106A-106D (1210), the hub node 102 waits to receive responses from the leaf node(s) 106A-106D. After one or more leaf nodes perform the operations described above with respect to FIGS. 9-11D and transmit their respective trench line data to the hub node 102, the hub node 102 receives the trench line data from the one or more leaf nodes (1220).

One of the advantages of this technique is that the hub node 102 can estimate skew/quadrature-error from the available slope trench lines of any two available subcarriers that might not necessarily be Hermitian pairs. This provides the flexibility for transmitter impairments mitigation without necessarily processing the mirrored subcarrier (Direct and Hermitian). However, depending upon which subcarrier slope lines are available, this estimation accuracy can vary. For instance, as noted above, data for subcarriers associated with the outermost pairs may provide the best error estimation. In general, the estimation error is lowest when using subcarrier pairs that are widely spaced in frequency.

After receiving the trench line data from the one or more leaf nodes, the hub node 102 can select the optimum available subcarrier pairs using the estimation accuracy confidence table and store weights (1230). The following example illustrates how available subcarrier pairs can be selected and corresponding weights stored.

Figures 13A, 13B:
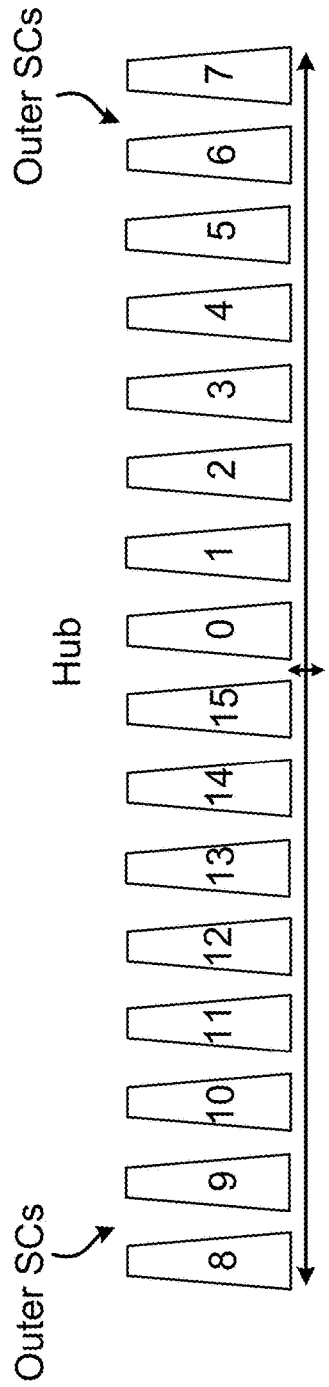
FIG. 13A depicts an example spectral arrangement of 16 subcarriers and subcarrier pairing.
FIG. 13B depicts an example Estimation Accuracy Confidence Table.

In this example, a transmitter (Hub node 102) transmits data across 16 subcarriers to 16 individual Leaf Node receivers. An example of the subcarrier distribution of the 16 subcarriers is shown in FIG. 13A. FIG. 13A shows subcarriers SC0-SC15. Subcarrier SC0 has a Hermitian pair in the form of SC15. Subcarrier SC1 has a Hermitian pair in the form of SC14. Subcarrier SC2 has a Hermitian pair in the form of SC13. Subcarrier SC3 has a Hermitian pair in the form of SC12. Subcarrier SC4 has a Hermitian pair in the form of SC11. Subcarrier SC5 has a Hermitian pair in the form of SC10. Subcarrier SC6 has a Hermitian pair in the form of SC9. Subcarrier SC7 has a Hermitian pair in the form of SC8. Each of these subcarriers are allocated to different leaf nodes. Subcarriers SC7 and SC 8 are the outermost subcarrier pairs, and subcarriers SC0 and SC15 are the innermost subcarrier pairs.

After receiving the trench line data, the hub node 102 can select subcarrier pairs from among the numerous pairs possible. The Hub node 102 can select a subcarrier, e.g., subcarrier 9 (SC9), as a reference subcarrier and can measure the skew as point of intersection of SC9 and other subcarrier slopes, e.g., (SC0, SC9), (SC1, SC9), ..., (SC14, SC9), (SC15, SC9). In general, any subcarrier can be used as a reference subcarrier. In general, selecting neighboring subcarriers (e.g., SC8, SC10 and SC11) may not yield reliable compensation estimates. More reliable estimates can be obtained from subcarrier Hermitian pairs and pairs with higher carrier frequency. These generally implicate subcarriers further to at or around the leftmost or right most parts of the spectral arrangement, e.g., subcarriers SC4-7.

The hub node 102 can store or have access to a skew/quadrature-error estimation accuracy confidence table that provides a confidence weight to each pair of subcarriers. FIG. 13B illustrates an example of a table. The rows and columns of the table are arranged in a manner similar to the arrangement of the subcarriers. The column and row numbers refer to the subcarrier pairs. For example, column 15, row 6 refers to the subcarrier pair 15, 6 or (SC15, SC6). The number value at the intersection of the row and column refers to the weight value. The weights range from 0 to 5-5 being the highest and 0 being the lowest. Based on the available subcarrier pairs, the estimated skew can be adjusted in steps.

As an example, if a subcarrier pair of SC9 and SC7 (or vice versa) is chosen, such a pair would have a confidence weight of 5. If a subcarrier pair of SC9 and SC15 (or vice versa) is chosen, such a pair would have a confidence weight of 1. Referring to FIG. 13A, the distance between SC9 and SC7 is far greater than the distance between SC9 and SC 15. Thus, the reliability of a SC9-SC7 pair is greater as expected. A large skew adjustment can be made if weight 5 subcarrier pairs are available whereas a smaller adjustment is made with weight 1 subcarrier pair. No adjustments are made with weight 0 subcarrier pairs. The ultimate goal of this adjustment is to slowly move the residual skew close to the 'zero' skew region. Quadrature-error can also be adjusted in the similar fashion.

After the hub node 102 selects the best available subcarrier pairs using the estimation accuracy confidence table and weights associated with the selected subcarrier pairs, the hub node 102 can determine the skew and quadrature error from the intersection of the trench lines received from the leaf nodes that were allocated a subcarrier from the subcarrier pair (1240 in FIG. 12), as described above. If multiple estimates of the same weight are available, the hub node 102 can determine the multiple estimates and average the determined estimates (1250). The hub node 102 can update the estimated skew and quadrature error (1260) and can adjust the Tx filter coefficients of the compensation circuits to optimize the compensation of the impediments (1270). In this manner, impairments to the data introduced by transmitter components, e.g., the interleaver, modulator, DAC, of the hub node 102 can be compensated and improve the performance and reliability of the communication system as a whole.

The implementation of FIG. 7 can be advantageous in some instances because the leaf nodes 106A-106D can store numerous headers and can average the headers to remove the effect of noise. Any remaining impairments in the averaged header data is largely due to hub transmitter-introduced impairments. One advantage of the implementation of FIG. 1 relative to FIG. 7 is that the data snapshot 110A-110D can include a larger set of data compared to size of a frame header, and thus the sampling size of the data snapshots 110A-110D can be larger, thus providing a better sample set to perform impairment compensation at the transceiver in the hub node 102.

The above-described transmitter impairments estimation systems and methods are not limited to skew/quadrature-error adjustments. The method can also be extended to address other impairments like IQ gain imbalances. Since gain imbalances have no dependency on skew or quadrature-error, they can be estimated in a separate independent sweep. The Tx IQ gain imbalance estimation system and method are similar to the system and method described above for Tx skew/quadrature-error estimation except that instead of adding and subtracting (inverting) skew and quadrature-error, IQ gain imbalance is added and inverted in filters Hc(t) and Hd(t), respectively $$H_c(t)=[g_I I+g_Q Q]$$

$$H_d(t)=[g_Q I+g_I Q]$$

Here, I and Q correspond to in-phase and quadrature signals, respectively. $g_I$ and $g_Q$ are the gain imbalances.

Although FIGS. 9 and 12 describe operations that are performed at a leaf node and the hub node, respectively, implementations are not limited to these example flowcharts. In some implementations, certain operations described as being performed in the hub node in FIG. 12 may be performed in the leaf node, or vice versa. For example, in some implementations, one or more determinations such as the determination of the skew and quadrature error may be performed at the leaf node instead of the hub node. Similarly, in some implementations, certain operations described as being performed in a leaf node in FIG. 9 may be performed in the hub node, or vice versa. For example, in some implementations, the averaging of frame headers and subsequent calculations can be performed at the hub node instead of the leaf node.

While this specification contains many specifics, these should not be construed as limitations on the scope of the disclosure or of what may be claimed, but rather as descriptions of features specific to particular implementations. Certain features that are described in this specification in the context of separate implementations may also be combined. Conversely, various features that are described in the context of a single implementation may also be implemented in multiple implementations separately or in any suitable subcombination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation. Similarly, the separation of various system components in the implementations described above should not be understood as requiring such separation in all implementations.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, some or all of the components described herein can be implemented using digital electronic circuitry, or in computer software, firmware, or hardware, or in combinations of one or more of them. In another example, one or more of the operations described above with respect to FIGS. 9 and 12 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or remote from each other and typically interact through a communication network. Examples of communication networks include a local area network ("LAN") and a wide area network ("WAN"), an inter-network (e.g., the Internet), and peer-to-peer networks (e.g., ad hoc peer-to-peer networks). A relationship of client and server may arise by virtue of computer programs running on the respective computers and having a client-server relationship to each other.

Terms used herein and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

What is claimed is:

1. A communications system comprising:
   a transceiver comprising:
      a frame counter configured to generate a trigger signal;
      at least one processor configured to generate a synchronization instruction message in response to generation of the trigger signal, the synchronization instruction message including instructions to provide a data snapshot at a time; and
      a transmitter configured to transmit, using a plurality of subcarriers, the synchronization instruction message to a plurality of system nodes, each of the plurality of subcarriers being associated with one of the plurality of system nodes; and
      a receiver configured to receive data snapshots from the plurality of system nodes,
   wherein, in response to receiving the data snapshots, the at least one processor is configured to compensate data transmissions to the plurality of system nodes based on the data snapshots.

2. The communications system of claim 1, wherein:
   the frame counter is configured to generate the trigger signal in response to a count of the frame counter equaling a number determined based on a periodicity of the subcarriers, a forward error correction frame length, and a Fast Fourier Transform window size.

3. The communications system of claim 1, wherein the synchronization instruction message includes at least one of:
   the time and date to provide the data snapshot; and
   a numerical count such that at an expiration of the numerical count, the data snapshot is to be provided to the receiver.

4. The communications system of claim 1, wherein the transmitter is configured to transmit the synchronization instruction message simultaneously to each of the plurality of system nodes.

5. The communications system of claim 1, wherein to compensate the data transmissions to the plurality of system nodes, the at least one processor is configured to reduce impairments in transmissions to the plurality of system nodes generated by the transmitter.

6. The communications system of claim 1, wherein each of the plurality of system nodes is configured to:
   receive the synchronization instruction message;
   determine the time at which a nodal data snapshot is to be obtained based on the synchronization instruction message;
   obtain the nodal data snapshot at the time; and
   transmit the nodal data snapshot through a feedback channel to the receiver.

7. The communications system of claim 6, wherein the nodal data snapshot is part of the data snapshots provided by each of the plurality of system nodes to the receiver.

8. The communications system of claim 6, wherein, for each of the plurality of system nodes, the data snapshot comprises a copy of a portion of node-specific data received from the transmitter and processed by the system node at the time.

9. The communications system of claim 1, wherein, to compensate data transmissions to the plurality of system nodes based on the data snapshots, the at least one processor is configured to:
determine filter coefficient values of a filter based on the data snapshots;
configure the filter based on the filter coefficient values; and
apply the filter to the data transmissions.

10. The communications system of claim 1, wherein one or more of the plurality of system nodes are located in geographically different locations from other ones of the system nodes.

11. An optical hub node connected to a plurality of leaf nodes through an optical communication network, the optical hub node comprising:
a transmitter configured to transmit, using a plurality of subcarriers, a synchronization instruction message to the plurality of leaf nodes, each of the plurality of subcarriers being associated with one of the plurality of leaf nodes, the synchronization instruction message including instructions to provide a data snapshot at a determined time; and
a receiver configured to receive data snapshots from the plurality of leaf nodes,
wherein the optical hub node is configured to compensate data transmissions to the plurality of leaf nodes based on and upon receiving the data snapshots.

12. The optical hub node of claim 11, wherein the optical hub node comprises a frame counter configured to:
count to a number determined based on a periodicity of the subcarriers, a forward error correction frame length, and a Fast Fourier Transform window size; and
generate a trigger signal in response to the frame counter counting to the number, the trigger signal configured to trigger the transmission of the synchronization instruction message.

13. The optical hub node of claim 11, wherein the synchronization instruction message includes at least one of:
a time and date to provide the data snapshot; and
a numerical count such that at an expiration of the numerical count, the data snapshot is to be provided to the receiver.

14. The optical hub node of claim 11, wherein the transmitter is configured to transmit the synchronization instruction message simultaneously to each of the plurality of leaf nodes.

15. The optical hub node of claim 11, wherein to compensate the data transmissions to the plurality of leaf nodes, the transmitter is configured to reduce impairments in the data transmissions to the plurality of leaf nodes generated by the transmitter.

16. The optical hub node of claim 11, wherein the data snapshots comprise a copy of a portion of node-specific data received from the transmitter and processed by each of the leaf nodes at the determined time.

17. The optical hub node of claim 11, wherein, to compensate data transmissions to the plurality of leaf nodes based on the data snapshots, the optical hub node is configured to:
determine filter coefficient values of a filter based on the data snapshots;
configure the filter based on the filter coefficient values; and
apply the filter to the data transmissions.

18. The optical hub node of claim 11, wherein one or more of the plurality of leaf nodes are located in geographically different locations from other ones of the leaf nodes.

19. An optical communication network node connected to a communication network node hub, the optical communication network node comprising:
a receiver configured to receive a synchronization instruction message and nodal data destined for the optical communication network node from the optical communication network node hub, the synchronization instruction message including instructions to send a data snapshot to the communication network node hub at a particular time;
at least one processor configured to obtain the data snapshot at the particular time; and
a transmitter configured to transmit the data snapshot to the communication network node.

20. The optical communication network node of claim 19, wherein the data snapshot comprises a copy of a portion of the nodal data received and being processed by the optical communication network node at the particular time.

* * * * *